(12) United States Patent
Wu et al.

(10) Patent No.: US 11,757,514 B2
(45) Date of Patent: *Sep. 12, 2023

(54) SIGNALING DESIGN FOR JOINT UPLINK DATA AND CHANNEL STATE INFORMATION FEEDBACK

(71) Applicant: QUALCOMM Incorporated, San Diego, CA (US)

(72) Inventors: Liangming Wu, Beijing (CN); Yu Zhang, San Diego, CA (US); Chenxi Hao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,457

(22) Filed: Jun. 29, 2022

(65) Prior Publication Data

US 2022/0329306 A1 Oct. 13, 2022

Related U.S. Application Data

(63) Continuation of application No. 16/610,179, filed as application No. PCT/CN2018/088200 on May 24, 2018, now Pat. No. 11,394,442.

(30) Foreign Application Priority Data

May 27, 2017 (WO) ................ PCT/CN2017/086246

(51) Int. Cl.
*H04B 7/06* (2006.01)
*H04W 72/1268* (2023.01)
*H04W 72/23* (2023.01)

(52) U.S. Cl.
CPC ...... *H04B 7/0626* (2013.01); *H04W 72/1268* (2013.01); *H04W 72/23* (2023.01)

(58) Field of Classification Search
CPC ............ H04B 7/0626; H04W 72/1268; H04W 72/14; H04W 72/1278; H04W 56/00
See application file for complete search history.

(56) References Cited

U.S. PATENT DOCUMENTS

| | | | |
|---|---|---|---|
| 9,451,488 B2 | 9/2016 | Park et al. | |
| 2009/0190528 A1* | 7/2009 | Chung | H04B 7/0639 370/328 |

(Continued)

FOREIGN PATENT DOCUMENTS

| | | |
|---|---|---|
| CN | 101917259 A | 12/2010 |
| CN | 102595596 A | 7/2012 |

(Continued)

OTHER PUBLICATIONS

Nokia., et al., "On the CSI Timing Relationships", R1-1612872, 3GPP TSG-RAN WG1#87, Reno, USA, Nov. 14-18, 2016, 4 Pages.

(Continued)

*Primary Examiner* — Dady Chery
(74) *Attorney, Agent, or Firm* — QUALCOMM Incorporated

(57) ABSTRACT

A user equipment (UE) may be configured with a first set of indexed timing offsets for determining offsets between uplink grants and uplink data transmissions and a second set of indexed timing offsets for determining offsets between an aperiodic channel state information (CSI) trigger and transmission of an aperiodic CSI report. A UE may receive both an uplink grant for an uplink data transmission and an aperiodic CSI report trigger. The UE may determine a timing offset for transmission of both the uplink data transmission and the aperiodic CSI report. The timing offset may be based at least in part on the first set of indexed timing offsets, the second set of indexed timing offsets, or a third set of indexed timing offsets for joint transmission of uplink data and (Continued)

aperiodic CSI. The UE may transmit the uplink data transmission and the aperiodic CSI report according to the timing offset.

30 Claims, 12 Drawing Sheets

(56) References Cited

U.S. PATENT DOCUMENTS

| | | | |
|---|---|---|---|
| 2010/0150114 | A1 | 6/2010 | Che |
| 2012/0147794 | A1 | 6/2012 | Chung et al. |
| 2014/0079149 | A1* | 3/2014 | Lee .................. H04B 7/0417 |
| | | | 375/267 |
| 2014/0161093 | A1 | 6/2014 | Hoshino et al. |
| 2017/0135090 | A1 | 5/2017 | Yin et al. |
| 2018/0048447 | A1* | 2/2018 | Nogami ............ H04B 7/0626 |
| 2018/0331742 | A1* | 11/2018 | Yum ................. H04B 7/0626 |
| 2019/0140723 | A1* | 5/2019 | Yum ................. H04L 5/005 |
| 2020/0177253 | A1 | 6/2020 | Wu et al. |

FOREIGN PATENT DOCUMENTS

| | | | |
|---|---|---|---|
| CN | 104620627 | A | 5/2015 |
| CN | 105323855 | A | 2/2016 |
| KR | 20160121406 | A | 10/2016 |
| WO | WO2012094990 | A1 | 7/2012 |
| WO | WO2013067670 | A1 | 5/2013 |
| WO | WO2014107904 | A1 | 7/2014 |
| WO | WO2016182406 | A1 | 11/2016 |
| WO | WO2017052251 | A1 | 3/2017 |
| WO | WO-2017078338 | A1 | 5/2017 |

OTHER PUBLICATIONS

Texas Instruments: "Views on CSI Measurement for LTE TDD eIMTA", R1-140530, 3GPP TSG-RAN WG1#76, Prague, Czech Republic, Feb. 10-14, 2014, 5 Pages.
Huawei., et al., "Discussion on CSI Feedback for 1ms TTI", 3GPP Draft, R1-1704258, 3GPP TSG RAN WG1 Meeting #88bis, 3rd Generation Partnership Project (3GPP), Mobile Competence Centre, 650, Route Des Lucioles, F-06921, Sophia-Antipolis Cedex, France, vol. RAN WG1. No. Spokane, USA, Apr. 3-Apr. 7, 2017, Apr. 2, 2017 (Apr. 2, 2017), XP051242410, 4 Pages, Retrieved from the Internet: URL:http://www.3gpp.org/ftp/Meetings_3GPP_SYNC/RAN1/Docs/ [retrieved on Apr. 2, 2017] Section "2 Discussion" | "CSI Reporting", "Proposal 1", "Proposal 2" Section "3 Conclusion".
International Preliminary Report on Patentability—PCT/CN2017/086246, The International Bureau of WIPO—Geneva, Switzerland, dated Dec. 12, 2019.
International Preliminary Report on Patentability—PCT/CN2018/088200, The International Bureau of WIPO—Geneva, Switzerland, dated Dec. 12, 2019.
International Search Report and Written Opinion—PCT/CN2017/086246—ISA/EPO—dated Feb. 23, 2018.
International Search Report and Written Opinion—PCT/CN2018/088200—ISA/EPO—Aug. 22, 2018.
Nokia, et al., "On CSI and SRS Timing With 1-ms TTI", 3GPP Draft, R1-1704789, 3GPP TSG-RAN WG1 Meeting #88bis, CSI and SRS With 1-MS LR, 3rd Generation Partnership Project (3GPP), Mobile Competence Centre, 650, Route Des Lucioles, F-06921, Sophia-Antipolis Cedex, France, vol. RAN WG1. No. Spokane, US, Apr. 3-Apr. 7, 2017, Apr. 2, 2017 (Apr. 2, 2017). XP051242925, 3 Pages, Retrieved from the Internet: URL:http://www.3gpp.org/ftp/Meetings_3GPP_SYNC/RAN1/Docs/ [retrieved on Apr. 2, 2017] Section "2 Discussion", Proposals 1 and 3, Section "3 Conclusions".
Nokia., et al., "On the CSI Timing Relationships", 3GPP Draft, R1-1701099, 3GPP TSG RAN WG1 NR Ad-Hoc, 3rd Generation Partnership Project (3GPP), Mobile Competence Centre, 650, Route Des Lucioles, F-06921, Sophia-Antipolis Cedex, France, vol. RAN WGI, No. Spokane, USA, Jan. 16-Jan. 20, 2017,Jan. 16, 2017 (Jan. 16, 2017), XP051208613, 4 Pages, Retrieved from the Internet: URL:http://www.3gpp.org/ftp/Meetings_3GPP_SYNC/RANI/Docs/ [retrieved on Jan. 16, 2017] Section "3.1 Aperiodic CSI Reporting with Aperiodic CSI-RS", "1) Joint control . . .", 2) Separate the Control of CSI Report, "Option 1: Utilize UL Grant to Trigger Aperiodic CSI Report on NR-PUSCH. Where the Timing N and the Resource of CSI Report are Implicitly Indicated via UL Scheduling Timing of NR-PUSCH," Also, Option 2. Proposals 1 and 2.
NTT Docomo, Inc., et al., "CSI Feedback for Shortened TTI with Shortened Processing Time", 3GPP Draft, R1-1708421, 3GPP TSG RAN WG1 Meeting #89, 3rd Generation Partnership Project (3GPP), Mobile Competence Centre, 650, Route Des Lucioles, F-06921, Sophia-Antipolis Cedex, France, vol. RAN WG1. No. Hangzhou, May 15-May 19, 2017, May 14, 2017 (May 14, 2017), XP051273614, pp. 1-7, Retrieved from the Internet: URL:http://www.3gpp.org/ftp/Meetings_3GPP_SYNC/RAN1/Docs/ retrieved on May 14, 2017] Section "2. Reference Resource for CSI Measurement" "Fig. 1 Existing Definition of CSI Reference Resource for p. CSI Reporting" Section "3.1. UE Behavior on Aperiodic CSI Feedback", Section "3.2. UE Behavior on Periodic and Aperiodic CSI Feedback".
Qualcomm Incorporated: "CR on Correction to the PUSCH Start Position Reference and Relative Timing Offeet in UL DCI for LAA", R1-1613134 3GPP TSG-RAN Meeting #87, Reno, USA Nov. 14, 2016, 7 pages.
Samsung: "CSI Measurement and Reporting for Processing Time Reduction", 3GPP Draft, 3GPP TSG RAN WG1 Meeting #88bis , R1-1705276—CSI Measurement and Reporting for Processing Time Reduction, 3rd Generation Partnership Project (3GPP), Mobile Competence Centre, 650, Route Des Lucioles, F-06921, Sophia-Ant, vol. RAN WG1. No. Spokane, USA, Apr. 3-Apr. 7, 2017, Apr. 2, 2017 (Apr. 2, 2017). XP051243406, pp. 1-3, Retrieved from the Internet: URL:http://www.3gpp.org/ftp/Meetings_3GPP_SYNC/RAN1/Docs/ [retrieved on Apr. 2, 2017] Section "2 Discussions", "Option 1", Fig. 1.
Supplementary European Search Report—EP18808969—Search Authority—The Hague—dated Jan. 19, 2021.
Taiwan Search Report—TW107117919—TIPO—dated Jan. 8, 2022.

* cited by examiner

SIGNALING DESIGN FOR JOINT UPLINK DATA AND CHANNEL STATE INFORMATION FEEDBACK

CROSS REFERENCE

The present Application for Patent is a continuation of U.S. patent application Ser. No. 16/610,179 by WU et al., entitled "SIGNALING DESIGN FOR JOINT UPLINK DATA AND CHANNEL STATE INFORMATION FEEDBACK" filed Nov. 1, 2019, and claims the benefit of Chinese PCT Patent Application No. PCT/CN2018/088200 by WU et al., entitled "SIGNALING DESIGN FOR JOINT UPLINK DATA AND CHANNEL STATE INFORMATION FEEDBACK" filed May 24, 2018, and to Chinese PCT Patent Application No. PCT/CN2017/086246 by WU et al., entitled "SIGNALING DESIGN FOR JOINT UPLINK DATA AND CHANNEL STATE INFORMATION FEEDBACK" filed May 27, 2017, each of which is assigned to the assignee hereof and each of which is expressly incorporated by reference in its entirety herein.

BACKGROUND

The following relates generally to wireless communication, and more specifically to signaling design for joint uplink data and CSI feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In a wireless communications system, a base station may transmit an uplink grant to a UE, indicating resources during which the UE may transmit data to the base station. The uplink grant may be associated with a timing offset between reception of the grant, and transmission of the uplink data. Additionally, a base station may transmit a channel state information (CSI) trigger, which may initiate CSI measurements followed by a CSI report. CSI reporting may provide information regarding a communications link to a base station, where CSI may include information determined by a UE associated with reception of signals over the link. The CSI trigger may be associated with a timing offset between the aperiodic CSI report trigger and the aperiodic CSI report. In some examples, the UE may be configured with a first set of indexed timing offsets between reception of the uplink grant and the uplink data transmission, and a second set of indexed timing offsets between reception of the aperiodic CSI report trigger and transmission of the aperiodic CSI report. The sets of indexed timing offsets may be configured at the UE in a higher layer (e.g., radio resource control (RRC) signaling) or be predefined at the UE. When the UE receives either an uplink grant or an aperiodic CSI report trigger, a field in the downlink channel information (DCI) may indicate an index corresponding one of the indexed offsets, to be utilized for a transmission of uplink data or a CSI report. However, current techniques for CSI reporting and uplink data transmission may experience efficiency or reliability problems in various circumstances such as when multiple types of transmissions (e.g., ultra reliable low latency communications (URLLC), enhanced mobile broadband (eMBB), etc.) are supported.

SUMMARY

The described techniques relate to improved methods, systems, devices, or apparatuses that support signaling design for joint uplink data and channel state information (CSI) feedback. Generally, the described techniques provide for receiving both an uplink grant for an uplink data transmission and an aperiodic CSI report trigger. The uplink grant may include the aperiodic CSI report trigger, and an index. A first set of indexed timing offsets may be associated with timing offsets between reception of the uplink grant and transmission of the uplink data, and a second set of indexed timing offsets may be associated with timing offsets between the aperiodic CSI report trigger and the aperiodic CSI report. The user equipment (UE) may determine a timing offset between reception of the uplink grant and the aperiodic CSI report trigger and transmission of both the uplink data transmission and the aperiodic CSI report. The UE may determine the timing offset based at least in part on the received index. The UE may determine the timing offset based at least in part on the first set of indexed timing offsets, the second set of indexed timing offsets, or a third set of indexed timing offsets for joint transmission of uplink data and aperiodic CSI. In some examples, the third set of indexed timing offsets may be equal to the first set of indexed timing offsets or the second set of indexed timing offsets. The UE may transmit the uplink data transmission and the aperiodic CSI report according to the timing offset.

A method of wireless communication is described. The method may include receiving an uplink grant for an uplink data transmission, the uplink grant including an aperiodic CSI report trigger for an aperiodic CSI report and an index, where a first set of indexed timing offsets are associated with timing offsets between reception of uplink grants and corresponding uplink data transmissions, and where a second set of indexed timing offsets are associated with timing offsets between reception of aperiodic CSI report triggers and corresponding aperiodic CSI report transmissions, determining a timing offset between reception of the uplink grant and the aperiodic CSI report trigger and transmission of both the uplink data transmission and the aperiodic CSI report based on the first set of indexed timing offsets and the index, and transmitting the uplink data transmission and the aperiodic CSI report according to the timing offset.

An apparatus for wireless communication is described. The apparatus may include a processor, memory in electronic communication with the processor, and instructions stored in the memory. The instructions may be executable by the processor to cause the apparatus to receive an uplink grant for an uplink data transmission, the uplink grant including an aperiodic CSI report trigger for an aperiodic CSI report and an index, where a first set of indexed timing offsets are associated with timing offsets between reception of uplink grants and corresponding uplink data transmissions, and where a second set of indexed timing offsets are associated with timing offsets between reception of aperiodic CSI report triggers and corresponding aperiodic CSI report transmissions, determine a timing offset between reception of the uplink grant and the aperiodic CSI report trigger and transmission of both the uplink data transmission and the aperiodic CSI report based on the first set of indexed timing offsets and the index, and transmit the uplink data transmission and the aperiodic CSI report according to the timing offset.

Another apparatus for wireless communication is described. The apparatus may include means for receiving an uplink grant for an uplink data transmission, the uplink grant including an aperiodic CSI report trigger for an aperiodic CSI report and an index, where a first set of indexed timing offsets are associated with timing offsets between reception of uplink grants and corresponding uplink data transmissions, and where a second set of indexed timing offsets are associated with timing offsets between reception of aperiodic CSI report triggers and corresponding aperiodic CSI report transmissions, determining a timing offset between reception of the uplink grant and the aperiodic CSI report trigger and transmission of both the uplink data transmission and the aperiodic CSI report based on the first set of indexed timing offsets and the index, and transmitting the uplink data transmission and the aperiodic CSI report according to the timing offset.

A non-transitory computer-readable medium storing code for wireless communication is described. The code may include instructions executable by a processor to receive an uplink grant for an uplink data transmission, the uplink grant including an aperiodic CSI report trigger for an aperiodic CSI report and an index, where a first set of indexed timing offsets are associated with timing offsets between reception of uplink grants and corresponding uplink data transmissions, and where a second set of indexed timing offsets are associated with timing offsets between reception of aperiodic CSI report triggers and corresponding aperiodic CSI report transmissions, determine a timing offset between reception of the uplink grant and the aperiodic CSI report trigger and transmission of both the uplink data transmission and the aperiodic CSI report based on the first set of indexed timing offsets and the index, and transmit the uplink data transmission and the aperiodic CSI report according to the timing offset.

Some examples of the method, apparatuses, and non-transitory computer-readable medium described herein may further include operations, features, means, or instructions for applying the index to a third set of indexed timing offsets for joint transmission of uplink data and aperiodic CSI to determine the timing offset, where the third set of indexed timing offsets may be based on the first set of indexed timing offsets.

Some examples of the method, apparatuses, and non-transitory computer-readable medium described herein may further include operations, features, means, or instructions for receiving a configuration message including the third set of indexed timing offsets.

Some examples of the method, apparatuses, and non-transitory computer-readable medium described herein may further include operations, features, means, or instructions for determining a subset of the third set of indexed timing offsets and where the applying the index includes applying the index to the subset of the third set of indexed timing offsets.

In some examples of the method, apparatuses, and non-transitory computer-readable medium described herein, the determining the subset of the third set of indexed timing offsets may be based on a CSI parameter type for the aperiodic CSI report, a number of CSI reference signal (CSI-RS) antenna ports, CSI-RS locations, a frequency granularity for the aperiodic CSI report, or a combination thereof.

In some examples of the method, apparatuses, and non-transitory computer-readable medium described herein, the third set of indexed timing offsets may be based on a union of the first set of indexed timing offsets and the second set of indexed timing offsets.

Some examples of the method, apparatuses, and non-transitory computer-readable medium described herein may further include operations, features, means, or instructions for selecting the second set of indexed timing offsets from a set of sets of indexed timing offsets based on a CSI parameter type for the aperiodic CSI report, a number of CSI reference signal (CSI-RS) antenna ports, CSI-RS locations, a frequency granularity for the aperiodic CSI report, or a combination thereof.

In some examples of the method, apparatuses, and non-transitory computer-readable medium described herein, the third set of indexed timing offsets may be based on an intersection of the first set of indexed timing offsets and the second set of indexed timing offsets.

Some examples of the method, apparatuses, and non-transitory computer-readable medium described herein may further include operations, features, means, or instructions for determining that the timing offset may be less than a minimum of the first set of indexed timing offsets and setting the timing offset to the minimum of the first set of indexed timing offsets.

Some examples of the method, apparatuses, and non-transitory computer-readable medium described herein may further include operations, features, means, or instructions for determining the third set of indexed timing offsets for joint transmission of uplink data and aperiodic CSI may be equivalent to the first set of indexed timing offsets.

Some examples of the method, apparatuses, and non-transitory computer-readable medium described herein may further include operations, features, means, or instructions for determining that the timing offset may be less than a minimum of the second set of indexed timing offsets and setting the timing offset to the minimum of the second set of indexed timing offsets.

Some examples of the method, apparatuses, and non-transitory computer-readable medium described herein may further include operations, features, means, or instructions for determining that the timing offset may be less than a minimum of the second set of indexed timing offsets and determining whether to set the timing offset to the indexed timing offset or to the minimum of the second set of indexed timing offsets based on a type of CSI for the aperiodic CSI report.

Some examples of the method, apparatuses, and non-transitory computer-readable medium described herein may further include operations, features, means, or instructions for determining a second timing offset from the first set of indexed timing offsets based on a second index, determining a third timing offset from the second set of indexed timing offsets based on a third index and determining the timing offset by selecting a maximum of the second timing offset and the third timing offset.

DETAILED DESCRIPTION

Figure 1:
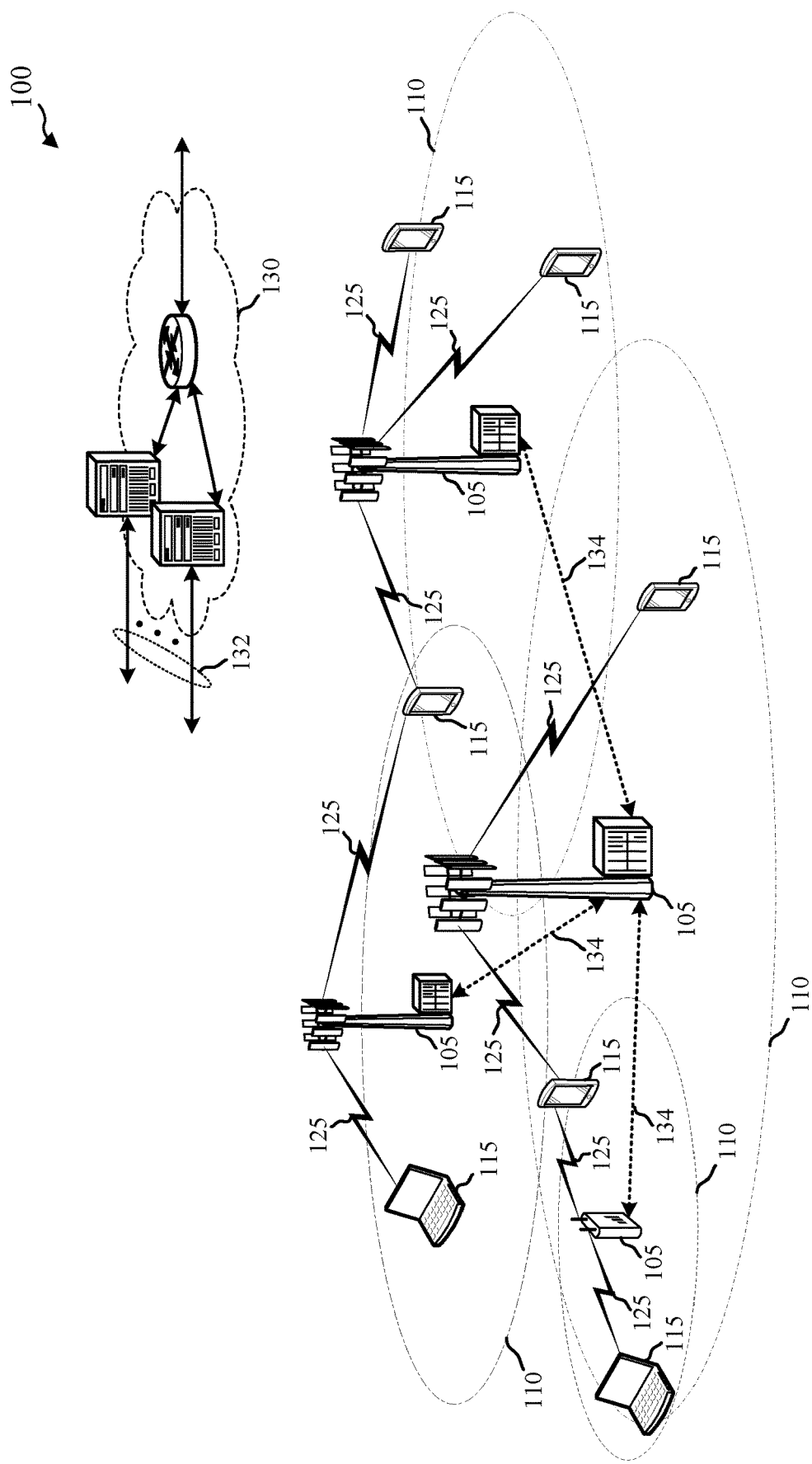
FIG. 1 illustrates an example of a system for wireless communication that supports signaling design for joint uplink data and channel state information (CSI) feedback in accordance with aspects of the present disclosure.

In a wireless communications system, a base station may transmit an uplink grant to a user equipment (UE), indicating resources during which the UE may transmit data to the base station. The uplink grant may be associated with a timing offset between reception of the grant, and transmission of the uplink data. Additionally, a base station may transmit a channel state information (CSI) trigger, which may initiate CSI measurements followed by a CSI report. CSI reporting may provide information regarding a communications link to a base station, where CSI may include information determined by a UE associated with reception of signals over the link. The CSI trigger may be associated with a timing offset between the aperiodic CSI report trigger and the aperiodic CSI report. In some examples, the UE may be configured with a first set of indexed timing offsets between reception of the uplink grant and the uplink data transmission. In some examples, the UE may be configured with a second set of indexed timing offsets between reception of the aperiodic CSI report trigger and transmission of the aperiodic CSI report. The sets of indexed timing offsets may be configured at the UE in a higher layer (e.g., radio resource control (RRC) signaling) or be predefined at the UE. When the UE receives either an uplink grant or an aperiodic CSI report trigger, a field in the downlink control information (DCI) may indicate an index corresponding to one of the indexed offsets, to be utilized for a transmission of uplink data or a CSI report. However, in some examples, the UE may receive both an uplink grant and an aperiodic CSI report trigger.

In some examples, the UE may support joint uplink data and CSI feedback when triggered in the same transmission time interval (TTI). For example, the CSI trigger may be received in the uplink grant, or the CSI trigger may be separate but occur in the same TTI (e.g., via a different DCI transmission). The joint uplink data and CSI feedback may be transmitted according to a timing offset. In some examples, the UE is configured with a third set of indexed timing offsets for joint transmission of uplink data and aperiodic CSI, or the third set of indexed timing offsets may be predefined at the UE. In some examples, the third set of indexed timing offsets may be equivalent to the first set of indexed timing offsets. In some examples, the third set of indexed timing offsets may be equivalent to the second set of indexed timing offsets. The UE may determine a subset of the third set of indexed timing offsets, or may utilize the entire set of values. The UE may receive an index from the base station, and may apply the index to a set of indexed timing offsets (e.g., the third set of timing offsets) to determine the timing offset.

In some examples, the UE may determine the third set of indexed timing offsets for joint transmission of uplink data and aperiodic CSI. For example, the third set of indexed timing offsets may be determined based on a union or an intersection of the first and second sets of indexed timing offsets. In such examples, the DCI may indicate an index corresponding to the third set of indexed timing offsets, and the UE may apply the index to the third set of indexed timing offsets to determine the timing offset. In some examples, the third set of indexed timing offsets may be equivalent to the first set of indexed timing offsets or equivalent to the second set of timing offsets. For instance, the third set of indexed timing offsets may be set equivalent to the second set of indexed timing offsets. In such examples, if the third indexed timing offset is less than the minimum value of the first set of indexed timing offsets, then the UE may automatically select the lowest value of the first set of indexed timing offsets. In some examples, the third set of indexed timing offsets may be set equivalent to the first set of indexed timing offsets. In such examples, if the third indexed timing offset is less than the minimum value of the second set of indexed timing offsets, then the UE may automatically select the lowest value of the second set of indexed timing offsets. In some cases, the UE may receive a first index indicating a timing offset from the first set of indexed timing offsets, and a timing index indicating a second timing offset from the second set of indexed timing offsets. For example, the UE may receive the first and second indexes in a downlink grant. In such cases, the UE may determine which of the timing offsets is greater, and select the maximum value of the two timing offsets.

Aspects of the disclosure are initially described in the context of a wireless communications system. Aspects of the disclosure are further illustrated by and described with reference to wireless communications schemes. Aspects of the disclosure are further illustrated by and described with reference to apparatus diagrams, system diagrams, and flowcharts that relate to signaling design for joint uplink data and CSI feedback.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support receiving both an uplink grant for an uplink data transmission and an aperiodic CSI report trigger at a wireless communications device (e.g., UE 115).

A first set of indexed timing offsets may be associated with timing offsets between the uplink grant and the uplink data transmission, and a second set of indexed timing offsets may be associated with timing offsets between the aperiodic CSI report trigger and the aperiodic CSI report. The UE may determine a timing offset between reception of the uplink grant and the aperiodic CSI report trigger and transmission of both the uplink data transmission and the aperiodic CSI report. The UE may determine the timing offset based at least in part on the first set of indexed timing offsets, the second set of indexed timing offsets, or a third set of indexed timing offsets for joint transmission of uplink data and aperiodic CSI. The UE may transmit the uplink data transmission and the aperiodic CSI report according to the timing offset.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless communications systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

In some cases, a base station 105 may gather CSI from a user equipment (UE) 115 in order to efficiently configure and schedule the channel. This information may be sent from the UE 115 in the form of a CSI report. A CSI report may contain a rank indicator (RI) requesting a number of layers to be used for downlink (DL) transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as a cell specific reference signal (CRS) or a channel state information reference signal (CSI-RS). RI and PMI may be excluded if the UE 115 does not support spatial multiplexing (or is not in a transmission mode that supports spatial multiplexing). The types of information included in the report determines a reporting type. CSI reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

Figure 2:
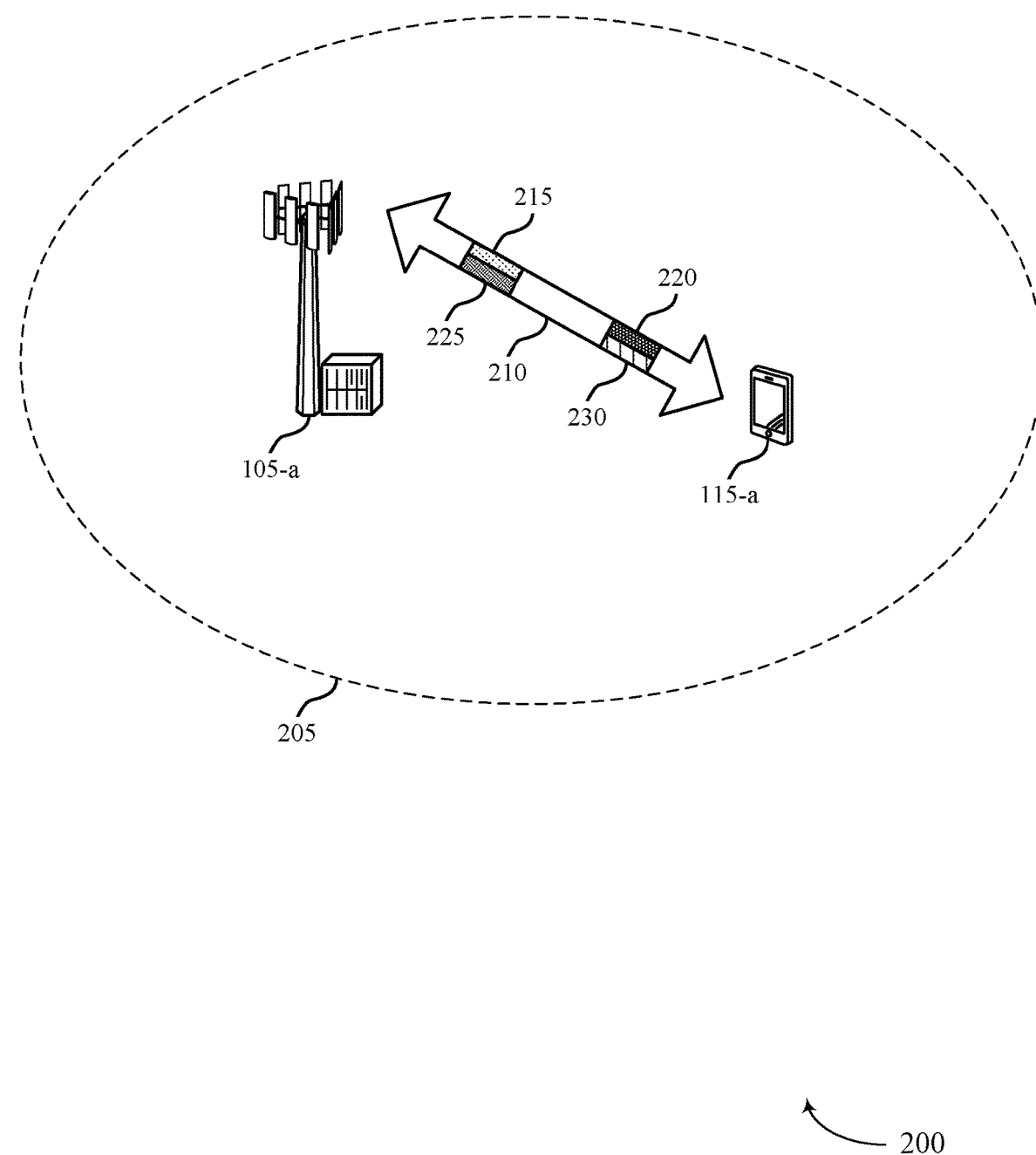
FIG. 2 illustrates an example of a wireless communications system that supports signaling design for joint uplink data and CSI feedback in accordance with aspects of the present disclosure.

FIG. 2 illustrates an example of a wireless communications system 200 that supports signaling design for joint uplink data and CSI feedback in accordance with various aspects of the present disclosure. In some examples, wireless communications system 200 may implement aspects of wireless communications system 100. Wireless communications system 200 may include a base station 105-*a* and a UE 115-*a*, which may be examples of the corresponding devices described with reference to FIG. 1.

In some examples, base station 105-*a* may be in communication with one or more UEs 115 within geographic coverage area 205. For example, base station 105-*a* may be in communication with UE 115-*a* via bidirectional communication link 210. Base station 105-*a* may transmit a downlink signal, which may include an uplink grant 215. In response, UE 115-*a* may send an uplink transmission, which may include uplink data 220. Additionally, in some examples, base station 105-*a* may transmit a downlink signal which may include an aperiodic CSI report trigger 225. UE 115-*b* may transmit an uplink signal, which may include an aperiodic CSI report 230. The delay between receiving uplink grant 215 and transmitting uplink data 220 may be referred to as a first timing offset, or $K_2$. $K_2$ may be indicated in the uplink grant 215 (e.g., the DCI), and may be configured at a higher level (e.g., the RRC layer) or determined dynamically by UE 115-*a*. In some cases, the uplink grant may correspond to a latency of traffic requirement. That is, base station 105-*a* and UE 115-*a* may support low latency transmissions such as URLLC, which may correspond to particular requirements regarding a permissible delay (e.g., $K_2$) between reception of uplink grant 215 and the transmission of uplink data 220.

The delay between receiving an aperiodic CSI report trigger 225 and transmitting the aperiodic CSI report 230 may correspond to a timing offset, or Y. UE 115-*a* may be required to execute computations regarding CSI prior to transmitting aperiodic CSI report 230. Thus, UE 115-*b* may restrict Y such that UE 115-*b* has sufficient time to compute CSI. In some cases, the CSI may be generated based on reference signals (e.g., CRS, CSI-RS, etc.), which may be indicated by the aperiodic CSI report trigger 225. Y may be restricted based on one or more conditions, which may include but are not limited to: a CSI parameter, a number of CSI-RS antenna ports, a CSI-RS location, a frequency granularity of CSI, or a number of simultaneous CSI calculations.

In some examples, UE 115-*a* may be configured with a first set of indexed timing offsets $\{K_2\}$ corresponding to possible $K_2$ values, and a second set of indexed timing offsets $\{Y\}$ corresponding to possible Y values. $\{K_2\}$ and $\{Y\}$ may be configured at the UE by higher layer signaling (e.g. RRC signaling) or may be predefined at the UE. In some examples, base station 105-*a* may transmit an index corresponding to $\{K_2\}$ and/or $\{Y\}$, as a part of a downlink signal (e.g., uplink grant 215 or aperiodic CSI report trigger 225), and UE 115-*a* may apply the index to one of $\{K_2\}$ (corresponding to uplink data 220) or $\{Y\}$ (corresponding to aperiodic CSI report 230). For example, UE 115-*a* may apply the index to $\{K_2\}$ to select $K_2$, or may apply the index to $\{Y\}$ to select Y. However, in some cases, UE 115-*a* may receive both an uplink grant 215 and aperiodic CSI report trigger 225 in the same TTI. In such cases, it may be beneficial to perform a joint transmission of both the uplink data 220 and the aperiodic CSI report 230. However, in various situations a selected value for one of K2 or Y may be inconsistent with the selected value or possible range of the other of K2 or Y.

In some examples, UE 115-*a* may identify a third set of indexed timing offsets $\{K_3\}$ for the joint transmission. In some cases, $\{K_3\}$ may be configured at a higher level (e.g.

RRC signaling) or may be predetermined. UE 115-*a* may receive an index from base station 105-*a*, which UE 115-*a* may apply to {$K_3$} to select $K_3$. Alternatively, {$K_3$} may be based at least in part on {$K_2$} and/or {Y}. In some cases, UE 115-*a* may set {$K_3$} equal to {Y}. In some cases, UE 115-*a* may set {$K_3$} equal to {$K_2$}. In such examples, if UE 115-*a* determines that a selected $K_3$ value is less than the minimum value of the non-equivalent set, UE 115-*a* may set $K_3$ equal to the minimum value of the non-equivalent set. In some examples, UE 115-*a* may receive an index corresponding to {$K_2$}, which may be applied to select $K_2$, and an index corresponding to {Y}, which may be applied to select Y. In such examples, UE 115-*a* may set $K_3$ equal to the maximum of $K_2$ and Y.

Figure 3:
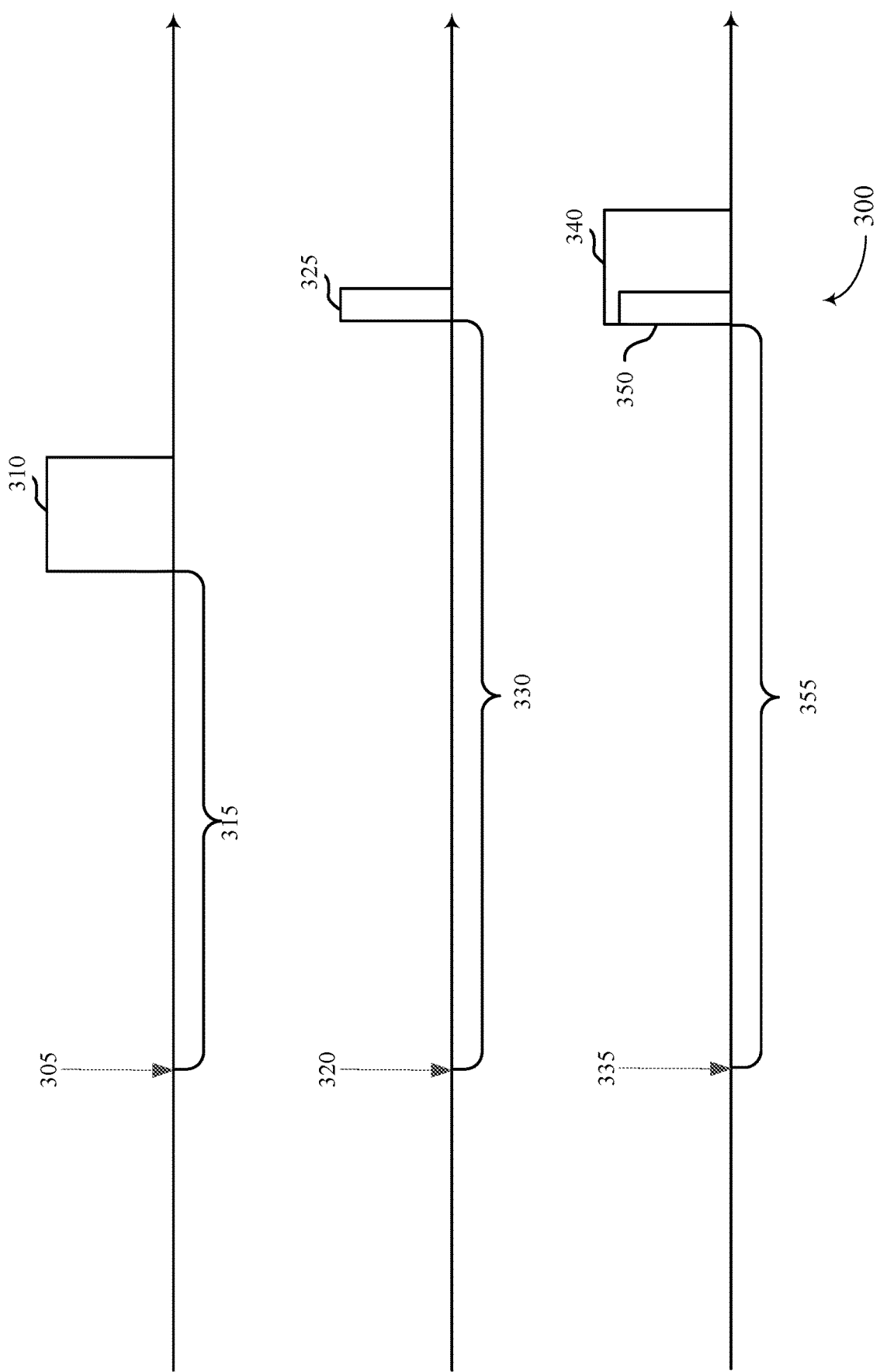
FIG. 3 illustrates an example of a wireless communications scheme that supports signaling design for joint uplink data and CSI feedback in accordance with aspects of the present disclosure.

FIG. 3 illustrates an example of a wireless communications scheme 300 that supports signaling design for joint uplink data and CSI feedback in accordance with various aspects of the present disclosure. In some examples, wireless communications scheme 300 may implement aspects of wireless communications system 100 and wireless communications system 200. Wireless communications scheme 300 may be implemented by a base station 105-*a* and a UE 115-*a*, which may be examples of the corresponding devices described with reference to FIG. 1 and FIG. 2.

In some examples, base station 105-*a* may transmit an uplink grant 305 to UE 115-*a*. Uplink grant 305 may initiate the transmission of uplink data 310. Uplink data 310 may be transmitted after timing offset $K_2$ 315 based on traffic load, channel quality, or other parameters. In some cases, uplink grant 305 may correspond to a latency of traffic requirement. That is, base station 105-*a* and UE 115-*a* may support low latency transmissions such as ultra reliable low latency communication (URLLC) or other low latency communications, which may correspond to particular requirements regarding a permissible delay $K_2$ 315 between reception of uplink grant 305 and the transmission of uplink data 310. $K_2$ 315 may be indicated in the uplink grant 305 (e.g., via an index in the DCI), or may be configured at a higher level (e.g., the RRC layer) or determined dynamically by UE 115-*a*.

In some examples, base station 105-*a* may transmit an aperiodic CSI report trigger 320. Aperiodic CSI report trigger 320 may trigger aperiodic CSI report 325. Aperiodic CSI report 325 may be transmitted at a specific time after the trigger given by timing offset Y 330. The timing offset Y may provide UE 115-*a* with time to execute computations regarding CSI (and possibly measure CRS or CSI-RS) prior to transmitting aperiodic CSI report 325. Thus, base station 105-*a* may configure Y 330 such that UE 115-*a* has sufficient time to perform associated measurements and/or computations for CSI. Y 330 may be restricted based on one or more conditions, which may include but are not limited to: a CSI parameter, a number of CSI-RS antenna ports, a CSI-RS location, a frequency granularity of CSI, or a number of simultaneous CSI calculations.

In some examples, UE 115-*a* may be configured with a first set of indexed timing offsets {$K_2$} corresponding to possible $K_2$ values, and a second set of indexed timing offsets {Y} corresponding to possible Y 330 values. {$K_2$} and {Y} may be configured at UE 115-*a* by higher layer signaling (e.g. RRC signaling) or may be predefined at UE 115-*a*. {Y} may be configured according to similar techniques as discussed above. For example, {Y} could be configured to equal {1, 2, 3, 4}, or alternatively configured to equal {5, 6, 7, 8}. In a case where the number of CSI-RS ports is, for example, 8, CSI reporting may be Type-I CSI reporting, requiring a lower resolution. In such a case, {Y} may be set equal to {1, 2, 3, 4} based on the number of ports and CSI reporting type, because CSI computing may require less time. Alternatively, in a case where the number of CSI-RS ports is 16, for example, CSI reporting may be Type-II CSI reporting in order to produce high resolution CSI. In such a case, {Y} may be set equal to {5, 6, 7, 8} to provide more computation time between receiving an aperiodic CSI report trigger 320 and transmitting aperiodic CSI report 325.

In some examples, base station 105-*a* may transmit an index corresponding to {$K_2$} and/or an index corresponding to {Y}, as a part of a downlink signal (e.g., uplink grant 305, aperiodic CSI report trigger 320). UE 115-*a* may apply index 425 to {$K_2$} and/or index 425 to {Y}, resulting in a selected $K_2$ and/or a selected Y.

However, in some cases, UE 115-*a* may receive downlink signal 335, which may include both an aperiodic CSI report trigger and an uplink grant. In some examples, an aperiodic CSI report trigger may be included in an uplink grant (e.g. the aperiodic CSI report trigger may be included in the DCI). In some examples, an uplink grant may include both an aperiodic CSI report trigger and an index. In some examples, the uplink grant and the aperiodic report trigger may be transmitted and received separately (e.g., in separate DCI messages within the same TTI). In response to downlink signal 335, UE 115-*a* may transmit both aperiodic CSI report 350 and uplink data 340. In some examples, aperiodic CSI report 350 may be included within (e.g. multiplexed into) uplink data 340. In cases where both aperiodic CSI report 350 and the transmission of uplink data 340 are initiated by downlink signal 335, UE 115-*a* may determine a timing offset, or $K_3$ 335, between reception of downlink signal 335 and transmission of both the uplink data 340 and aperiodic CSI report 350 such that the timing offset $K_3$ takes into account the appropriate delay for both transmissions.

For instance, in some cases, Y 330 may be greater than $K_2$ 315. In such cases, although $K_2$ 315 may satisfy the requirements (e.g. low latency delay requirements) for transmission of uplink data 340, $K_2$ 315 may not satisfy computation time requirements necessary for the transmission of aperiodic CSI report 350. In such cases, it may be beneficial to determine $K_3$ such that all delay conditions are satisfied for both uplink data 340 and aperiodic CSI report 350.

In some examples, UE 115-*a* may identify a third set of indexed timing offsets {$K_3$}. {$K_3$} may be configured at a higher level (e.g. RRC signaling) or may be predetermined. UE 115-*a* may receive an index from base station 105-*a*, which UE 115-*a* may apply to {$K_3$} to select $K_3$ 355. In some cases, {$K_3$} may be based at least in part on {$K_2$} and/or {Y}. In some cases, UE 115-*a* may set {$K_3$} equal to one of {$K_2$} or {Y}. In some cases, the index 425 may indicate $K_3$ 355. In the case where {$K_3$} is equal to {$K_2$}, then $K_3$ 355 may equal $K_2$ 315. In some examples where UE 115-*a* may set {$K_3$} equal to one of {$K_2$} or {Y}, if UE 115-*a* determines that a selected $K_3$ value is less than the minimum value of the other set, UE 115-*a* may set $K_3$ equal to the minimum value of the other set. In some examples, UE 115-*a* may receive an index corresponding to {$K_2$}, which may be applied to select $K_2$, and an index corresponding to {Y}, which may be applied to select Y. In such examples, UE 115-*a* may set $K_3$ equal to the maximum of $K_2$ and Y.

Figure 4:
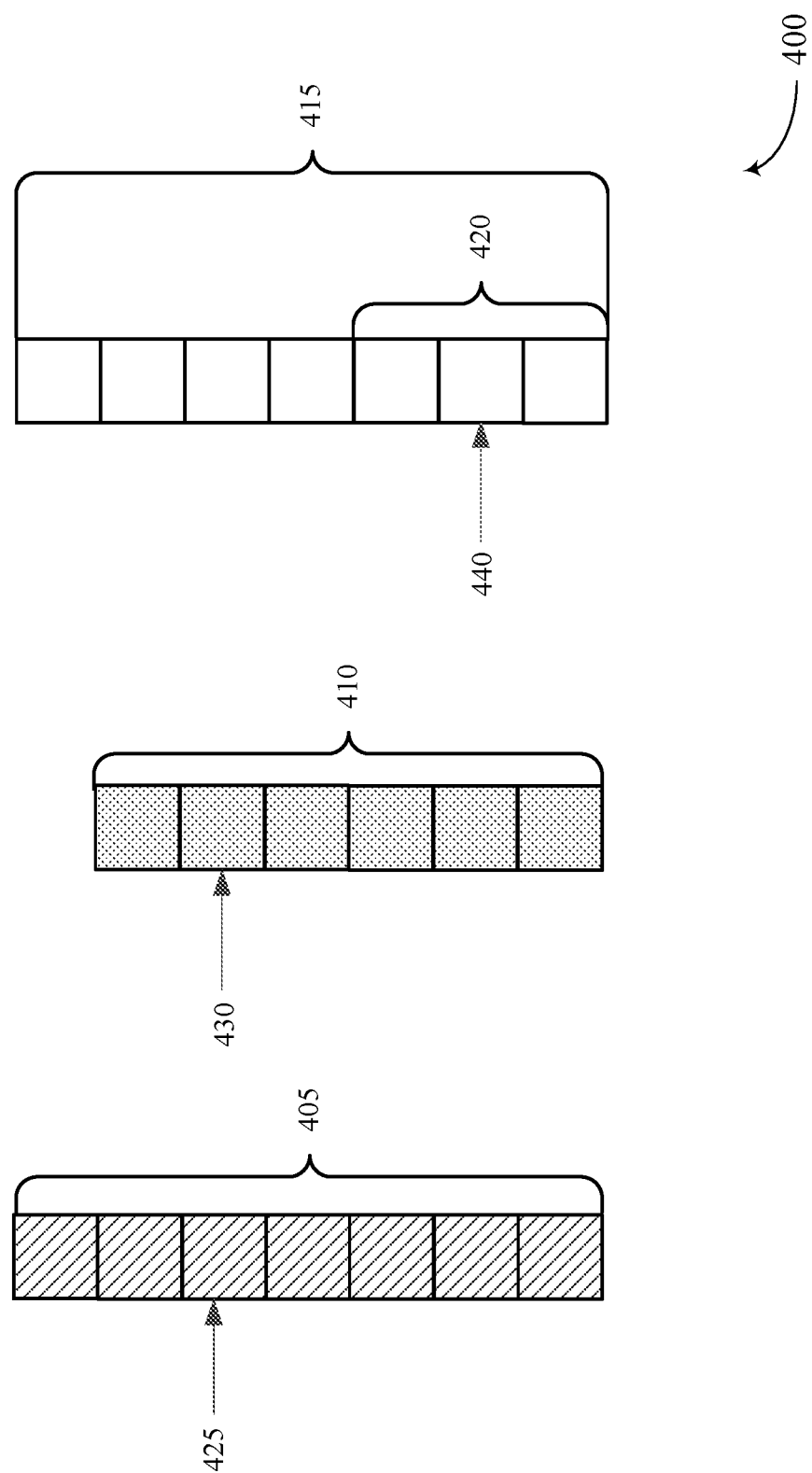
FIG. 4 illustrates an example of a wireless communications scheme that supports signaling design for joint uplink data and CSI feedback in accordance with aspects of the present disclosure.

FIG. 4 illustrates an example of a wireless communications scheme 400 that supports signaling design for joint uplink data and CSI feedback in accordance with various aspects of the present disclosure. In some examples, wireless communications scheme 400 may implement aspects of wireless communications system 100 and wireless communications system 200. Wireless communications scheme 400 may be implemented by a base station 105-a and a UE 115-a, which may be examples of the corresponding devices described with reference to FIGS. 1-3.

In some examples, UE 115-a may be configured with a set of indexed timing offsets $\{K_2\}$ 405 for uplink data transmission, a set of indexed timing offsets $\{Y\}$ 410 for aperiodic CSI reporting, and a set of indexed timing offsets $\{K_3\}$ 415 for joint transmission of uplink data and an aperiodic CSI report. UE 115-a may determine a value for $K_3$ 335 based at least in part on one or more of $\{K_2\}$ 405, $\{Y\}$ 410, or $\{K_3\}$ 415.

In some examples, UE 115-a may receive an index 440 in a downlink transmission from base station 105-a, and may apply index 440 to $\{K_3\}$ 415 to determine $K_3$ 335. In some examples, UE 115-a may determine a subset of $\{K_3\}$ 415 (e.g., $\{K_3,s\}$ 420). For instance, UE 115-a may receive a configuration message at the RRC layer identifying $\{K_3\}$ 415. UE 115-a may receive an uplink grant which corresponds to a condition such as particular latency requirement, and an aperiodic CSI report trigger, which may correspond to conditions such as CSI parameters, a number of CSI-RS antenna ports, a CSI-RS location, and a frequency granularity of the CSI. UE 115-a may utilize one or more of these conditions to determine a subset $\{K_3,s\}$ 420 that conforms to the utilized conditions. UE 115-a may also receive an index 440 from base station 105-b, which UE 115-a may apply to $\{K_3,s\}$ 420 to select $K_3$ 335. In cases UE 115-a does not determine a new $\{K_3,s\}$ 420. In such examples, UE 115-a may determine that $\{K_3,s\}$ 420 is equal to $\{K_3\}$ 415, and may proceed accordingly as described above.

In some examples, UE 115-a may utilize both $\{K_2\}$ 425 and $\{Y\}$ 410 to determine $\{K_3\}$ 415. UE 115-a may determine $\{K_3\}$ as a union of $\{K_2\}$ 405 and $\{Y\}$ 410. The union operation may re-order the possible values of $\{K_2\}$ 405 $\{Y\}$ 410 sequentially, or the sets may be concatenated to provide the indexed set of offsets $\{K_3\}$. In some examples, UE 115-a may determine an intersection of the $\{K_2\}$ 405 and $\{Y\}$ 410. For instance, UE 115-a may determine that a subset of the values in $\{K_2\}$ 405 correspond to a subset of the values in $\{Y\}$ 410. The overlapping or intersecting values may be combined to generate $\{K_3\}$ 415. That is, UE 115-a may determine that one or more possible $K_2$ values in $\{K_2\}$ 405 are equivalent to one or more possible Y values in $\{Y\}$ 410. In such examples, the equivalent values may be selected and included in $\{K_3\}$ 415. In each of the above examples, base station 105-a may transmit an index 440 to UE 115-a, which UE 115-a may apply to the newly determined $\{K_3\}$ 415 to identify $K_3$ between reception of the uplink grant and the aperiodic CSI report trigger and transmission of both the uplink data transmission and the aperiodic CSI report.

In some examples, UE 115-a may determine $\{K_3\}$ 415 by setting $\{K_3\}$ 415 equal to one of the $\{K_2\}$ 405 or $\{Y\}$ 410. For example, UE 115-a may set $\{K_3\}$ 415 equivalent to $\{Y\}$. In such cases, UE 115-a may use the index 440 from base station 105-a received for the aperiodic trigger, which UE 115-a may apply to $\{K_3\}$ 415 (which is equivalent to $\{Y\}$ 410). UE 115-a may determine that the indexed $K_3$ is less than the minimum value of $\{K_2\}$. However, as discussed above, if $K_3$ is less than the minimum value of $\{K_2\}$, then UE 115-a may not be able to transmit uplink data in a manner that complies with latency requirements for the uplink grant. Thus, if UE 115-a determines that the indexed $K_3$ is less than the minimum value of the $\{K_2\}$ 405, then UE 115-a may set $K_3$ to be equivalent to the minimum value of $\{K_2\}$ 405.

In some examples, UE 115-a may set $\{K_3\}$ 415 equivalent to $\{K_2\}$ 405. However, UE 115-a may determine that the indexed $K_3$ is less than the minimum value of $\{Y\}$ 410. As discussed above, if the indexed $K_3$ is less than the minimum value of $\{Y\}$, then UE 115-a may be unable to execute necessary CSI computations, or meet the requirements of the conditions corresponding to $\{Y\}$ 410. Thus, if UE 115-a determines than the indexed $K_3$ is less than the value of $\{Y\}$ 410, then UE 115-a may set $K_3$ to the minimum value of $\{Y\}$. Alternatively, UE 115-a may apply a feedback relaxation approach, which may allow the $K_3$ to be less than the minimum value of $\{Y\}$ 410. For instance, under a feedback relaxation approach, UE 115-a may transmit stale CSI that is not current. Additionally or alternatively, UE 115-a may relax the resolution requirements of a CSI report, such that less computation time is required to prepare and transmit a CSI report. Thus, under a feedback relaxation approach, transmitting an aperiodic CSI report would not be problematic, even if transmitted after a delay less than the minimum value of $\{Y\}$ 410. Additionally or alternatively, the feedback relaxation approach may be based on determining that certain CSI related conditions (e.g., a number of antenna ports or spatial layers is below a threshold, etc.) are satisfied.

In some examples, UE 115-a may receive index 425 and apply index 425 to $\{K_2\}$ 405 to select $K_2$. UE 115-a may additionally receive index 430 and apply index 430 to $\{Y\}$ 410 to select Y. UE 115-a may determine $K_3$ based on the maximum between $K_2$ and the Y. Additionally, UE 115-b may receive a second index from base station 105-a, which UE 115-a may apply to the second set to identify Y. In some examples, index 425 may be included in the DCI, or other signaling. Index 430 may be received via DCI signaling, semi-persistent signaling, or higher layer signaling. Having determined $K_2$ and Y, UE 115-a may set $K_3$ equal to the maximum of $K_2$ and Y.

Figure 5:
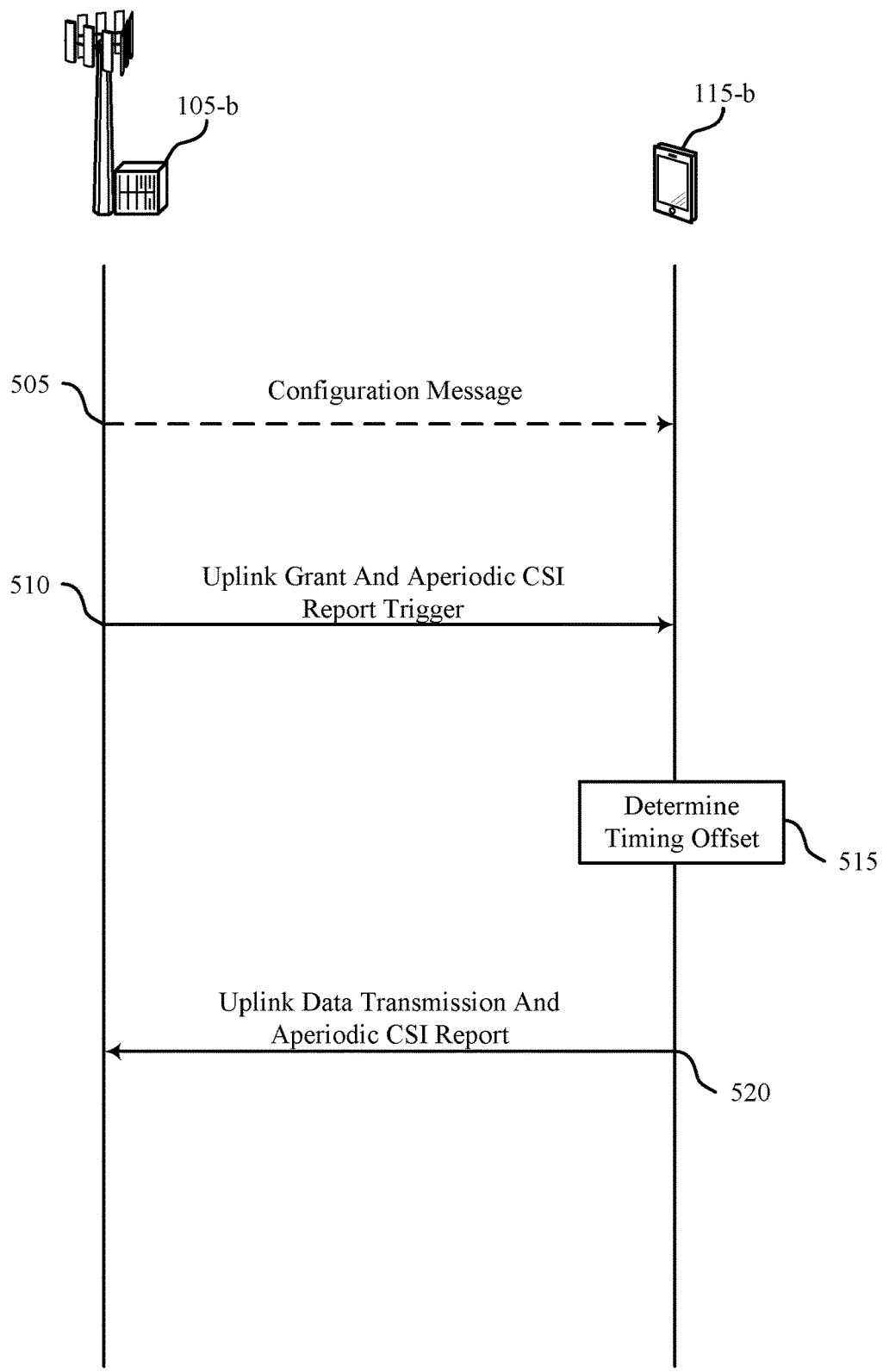
FIG. 5 illustrates an example of a process flow that supports signaling design for joint uplink data and CSI feedback in accordance with aspects of the present disclosure.

FIG. 5 illustrates an example of a process flow 500 that supports signaling design for joint uplink data and CSI feedback in accordance with various aspects of the present disclosure. In some examples, process flow 500 may be implemented by aspects of wireless communications system 100. Process flow 500 may be implemented by aspects of a base station 105-b and a UE 115-b, which may be examples of the corresponding devices described with reference to FIGS. 1-4.

At 505, base station 105-b may transmit a configuration message to UE 115-b. The configuration message may include a first set of indexed timing offsets between reception of an uplink grant and uplink data transmission (e.g., $\{K_2\}$), and a second set of indexed timing offsets between reception of aperiodic CSI report trigger and transmission of the aperiodic CSI report (e.g., $\{Y\}$). In some cases, UE 115-b may select the second set of indexed timing offsets from a plurality of sets of indexed timing offsets based at least in part on a CSI parameter type for the aperiodic CSI report, a number of CSI reference signal (CSI-RS) antenna ports, CSI-RS locations, a frequency granularity for the aperiodic CSI report, or a combination thereof. Additionally, the configuration message may include a third set of indexed timing offsets for joint transmission of uplink data and aperiodic CSI (e.g. $\{K_3\}$). Alternatively, $\{K_3\}$ may be the same as one of the sets of indexed offsets (e.g., (e.g., $\{K_2\}$, $\{Y\}$).

At 510, base station 105-b may transmit an uplink grant and an aperiodic CSI report trigger to UE 115-b. In some cases, the aperiodic CSI report trigger may be included in the uplink grant. In some cases, the uplink grant may include an index.

At 515, UE 115-b may determine a timing offset (e.g., $K_3$) between reception of the uplink grant and the aperiodic CSI report trigger and transmission of both the uplink data transmission and the aperiodic CSI report based at least in part on the first set of indexed timing offsets, the second set of indexed timing offsets, the third set of indexed timing offsets for joint transmission of uplink data and aperiodic CSI (e.g. $\{K_3\}$), or the index. For example, the timing offset may be based on the third set of indexed timing offsets (e.g., $\{K_3\}$) and the index. In some examples, the third set of indexed timing offsets may be equal to the first set of indexed timing offsets.

UE 115-b may apply the index to the third set of indexed timing offsets to determine the timing offset. In some examples, UE 115-b may determine a subset of the third set of indexed timing offsets, and in such examples may apply the index to the subset of the third set of indexed timing offsets. In some examples, determining the subset of the third set of indexed timing offsets may be based at least in part on a CSI parameter type for the aperiodic CSI report, a number of CSI reference signal (CSI-RS) antenna ports, CSI-RS locations, a frequency granularity for the aperiodic CSI report, or a combination thereof.

In some examples, UE 115-b may determine the third set of indexed timing offsets based at least in part on a union of the first set of indexed timing offsets and the second set of indexed timing offsets. In some examples, UE 115-b may determine the third set of indexed timing offsets based at least in part on an intersection of the first set of indexed timing offsets and the second set of indexed timing offsets. In such cases, UE 115-b may receive an index in the DCI, which can be applied to the determined third set of indexed timing offsets to determine the timing offset.

In some cases, UE 115-b may determine that the third set of indexed timing offsets for joint transmission of uplink data and aperiodic CSI is equivalent to the second set of indexed timing offsets. Additionally, UE 115-b may determine that the indexed timing offset of the third set of indexed timing offsets is less than a minimum of the first set of indexed timing offsets, and may set the timing offset to the minimum of the first set of indexed timing offsets. In some cases, UE 115-b may determine that the third set of indexed timing offsets for joint transmission of uplink data and aperiodic CSI is equivalent to the first set of indexed timing offsets. Additionally, UE 115-b may determine that that the indexed timing offset of the third set of indexed timing offsets is less than a minimum of the second set of indexed timing offsets, and may set the timing offset to the minimum of the second set of indexed timing offsets. Alternatively, in such cases, UE 115-b may determine that the indexed timing offset of the third set of indexed timing offsets is less than a minimum of the second set of indexed timing offsets, and may determine whether to set the timing offset to the indexed timing offset or to the minimum of the second set of indexed timing offsets based at least in part on a type of CSI for the aperiodic CSI report.

In some examples, UE 115-b may determine a first timing offset from the first set of indexed timing offsets based at least in part on a first index, determine a second timing offset from the second set of indexed timing offsets based at least in part on a second index, and determine the timing offset by selecting a maximum of the first timing offset and the second timing offset.

At 520, UE 115-b may transmit the uplink data transmission and the aperiodic CSI report according to the timing offset.

Figure 6:
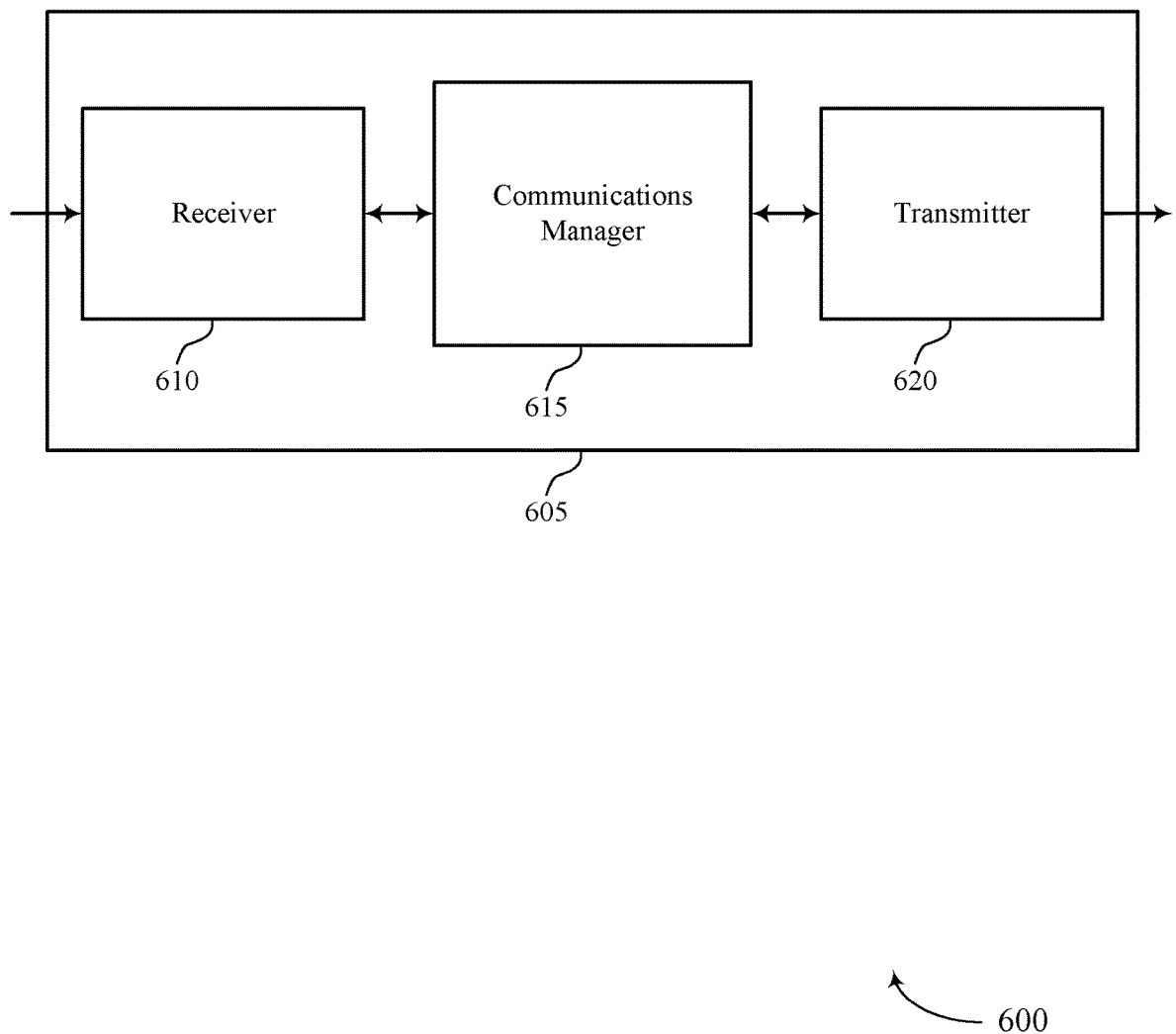
FIGS. 6 through 8 show block diagrams of a device that supports signaling design for joint uplink data and CSI feedback in accordance with aspects of the present disclosure.

FIG. 6 shows a block diagram 600 of a wireless device 605 that supports signaling design for joint uplink (uplink) data and CSI feedback in accordance with aspects of the present disclosure. Wireless device 605 may be an example of aspects of a user equipment (UE) 115 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to signaling design for joint uplink data and CSI feedback, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9. Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may receive an uplink grant for an uplink data transmission, the uplink grant comprising an aperiodic channel state information (CSI) report trigger for an aperiodic CSI report and an index, wherein a first set of indexed timing offsets are associated with timing offsets between reception of uplink grants and corresponding uplink data transmissions, and wherein a second set of indexed timing offsets are associated with timing offsets between reception of aperiodic CSI report triggers and corresponding aperiodic CSI report transmissions; determine a timing offset between reception of the uplink grant and the aperiodic CSI report trigger and transmission of both the uplink data transmission and the aperiodic CSI report based at least in part on the first set of indexed timing offsets and the index; and transmit the uplink data transmission and the aperiodic CSI report according to the timing offset.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
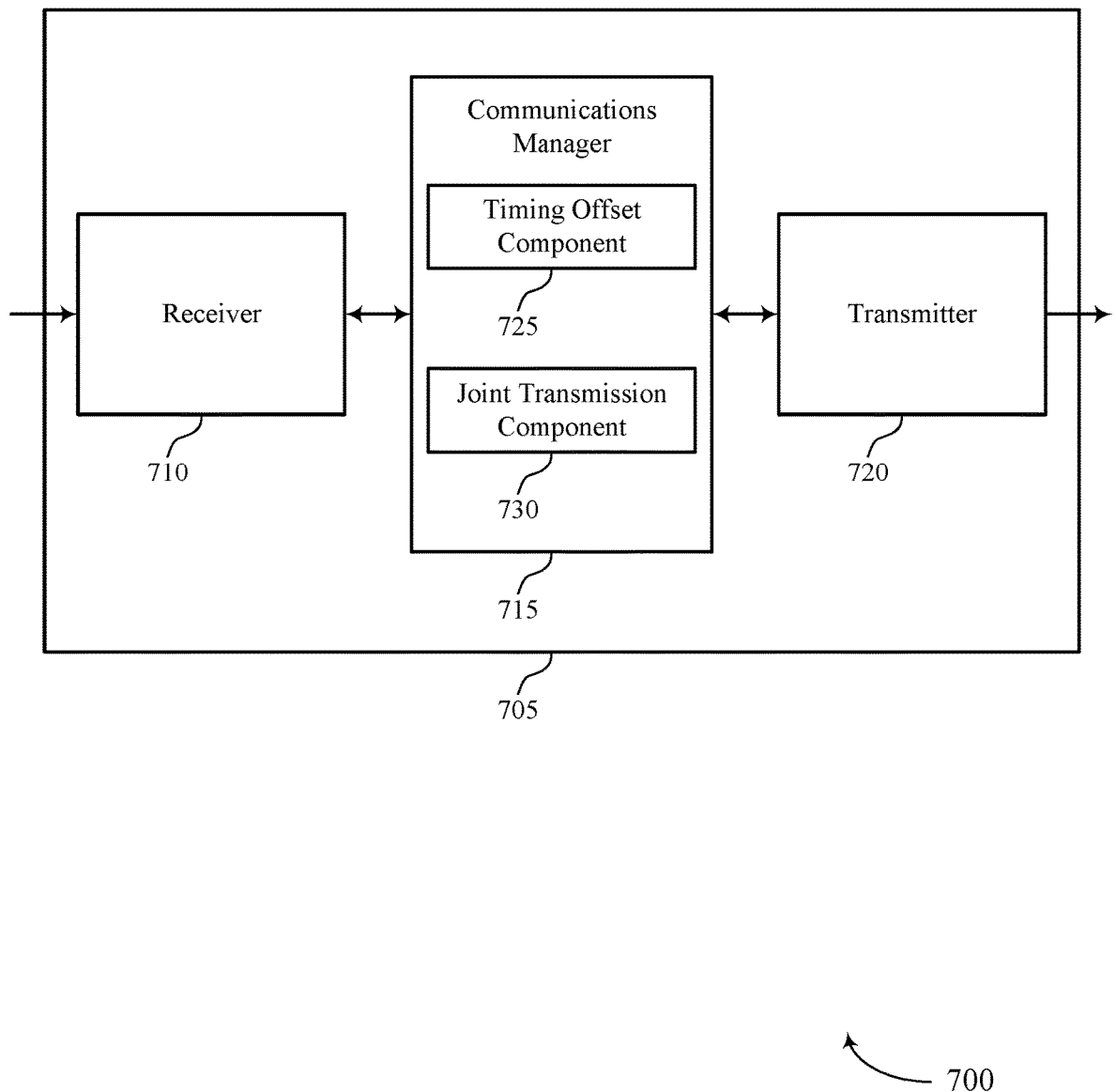

FIG. 7 shows a block diagram 700 of a wireless device 705 that supports signaling design for joint uplink data and CSI feedback in accordance with aspects of the present disclosure. Wireless device 705 may be an example of aspects of a wireless device 605 or a UE 115 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to signaling design for joint uplink data and CSI feedback, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include timing offset component 725 and joint transmission component 730.

Timing offset component 725 may receive an uplink grant for an uplink data transmission, the uplink grant comprising an aperiodic channel state information (CSI) report trigger for an aperiodic CSI report and an index, wherein a first set of indexed timing offsets are associated with timing offsets between reception of uplink grants and corresponding uplink data transmissions, and wherein a second set of indexed timing offsets are associated with timing offsets between reception of aperiodic CSI report triggers and corresponding aperiodic CSI report transmissions. Timing offset component 725 may determine a timing offset between reception of the uplink grant and the aperiodic CSI report trigger and transmission of both the uplink data transmission and the aperiodic CSI report based at least in part on the first set of indexed timing offsets and the index.

Timing offset component 725 may also determine that the third set of indexed timing offsets for joint transmission of uplink data and aperiodic CSI is equivalent to the first set of indexed timing offsets, determine that the timing offset is less than a minimum of the second set of indexed timing offsets, set the timing offset to the minimum of the second set of indexed timing offsets. Timing offset component 725 may also determine whether to set the timing offset to the indexed timing offset or to the minimum of the second set of indexed timing offsets based at least in part on a type of CSI for the aperiodic CSI report, and determine the timing offset by selecting a maximum of the second timing offset and the third timing offset.

Joint transmission component 730 may transmit the uplink data transmission and the aperiodic CSI report according to the timing offset. Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
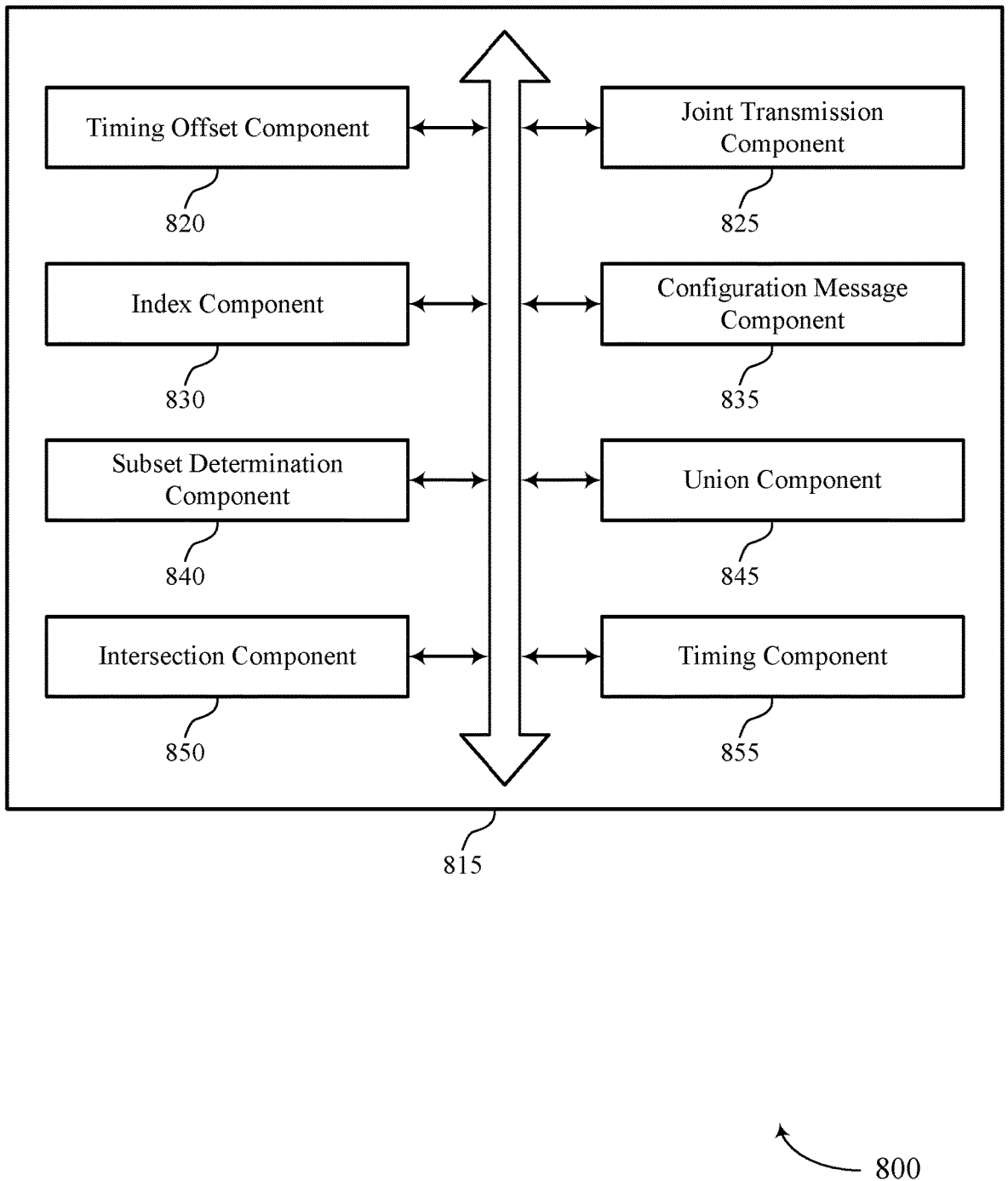

FIG. 8 shows a block diagram 800 of a communications manager 815 that supports signaling design for joint uplink data and CSI feedback in accordance with aspects of the present disclosure. The communications manager 815 may be an example of aspects of a communications manager 615, a communications manager 715, or a communications manager 915 described with reference to FIGS. 6, 7, and 9. The communications manager 815 may include timing offset component 820, joint transmission component 825, index component 830, configuration message component 835, subset determination component 840, union component 845, intersection component 850, and timing component 855. Each of these modules may communicate, directly or indirectly, with one another (e.g., via one or more buses).

Timing offset component 820 may receive an uplink grant for an uplink data transmission, the uplink grant comprising an aperiodic channel state information (CSI) report trigger for an aperiodic CSI report and an index, wherein a first set of indexed timing offsets are associated with timing offsets between reception of uplink grants and corresponding uplink data transmissions, and wherein a second set of indexed timing offsets are associated with timing offsets between reception of aperiodic CSI report triggers and corresponding aperiodic CSI report transmissions. Timing offset component 820 may also determine a timing offset between reception of the uplink grant and the aperiodic CSI report trigger and transmission of both the uplink data transmission and the aperiodic CSI report based at least in part on the first set of indexed timing offsets and the index.

Timing offset component 820 may also determine that the third set of indexed timing offsets for joint transmission of uplink data and aperiodic CSI is equivalent to the second set of indexed timing offsets, that the timing offset is less than a minimum of the second set of indexed timing offsets, set the timing offset to the minimum of the second set of indexed timing offsets, determine whether to set the timing offset to the indexed timing offset or to the minimum of the second set of indexed timing offsets based at least in part on a type of CSI for the aperiodic CSI report, and determine the timing offset by selecting a maximum of the second timing offset and the third timing offset.

Joint transmission component 825 may transmit the uplink data transmission and the aperiodic CSI report according to the timing offset. Index component 830 may the index to a third set of indexed timing offsets for joint transmission of uplink data and aperiodic CSI to determine the timing offset, wherein the third set of indexed timing offsets is based at least in part on the first set of indexed timing offsets, a second timing offset from the first set of indexed timing offsets based at least in part on a second index, and determining a third timing offset from the second set of indexed timing offsets based at least in part on a third index. In some cases, the index is received in the uplink grant. Configuration message component 835 may receive a configuration message including the third set of indexed timing offsets.

Subset determination component 840 may determine a subset of the third set of indexed timing offsets, where the applying the index includes applying the index to the subset of the third set of indexed timing offsets. In some cases, the determining the subset of the third set of indexed timing offsets is based on a CSI parameter type for the aperiodic CSI report, a number of CSI reference signal (CSI-RS) antenna ports, CSI-RS locations, a frequency granularity for the aperiodic CSI report, or a combination thereof.

Union component 845 may select the second set of indexed timing offsets from a set of sets of indexed timing offsets based on a CSI parameter type for the aperiodic CSI report, a number of CSI reference signal (CSI-RS) antenna ports, CSI-RS locations, a frequency granularity for the aperiodic CSI report, or a combination thereof. In some cases, the third set of indexed timing offsets is based on a union of the first set of indexed timing offsets and the second set of indexed timing offsets.

Intersection component 850 may select the third set of indexed timing offsets based on an intersection of the first set of indexed timing offsets and the second set of indexed timing offsets.

Timing component 855 may determine that the indexed timing offset of the third set of indexed timing offsets is less than a minimum of the first set of indexed timing offsets, set the third timing offset to the minimum of the first set of indexed timing offsets, and determine the third set of indexed timing offsets for joint transmission of uplink data and aperiodic CSI is equivalent to the first set of indexed timing offsets.

Figure 9:
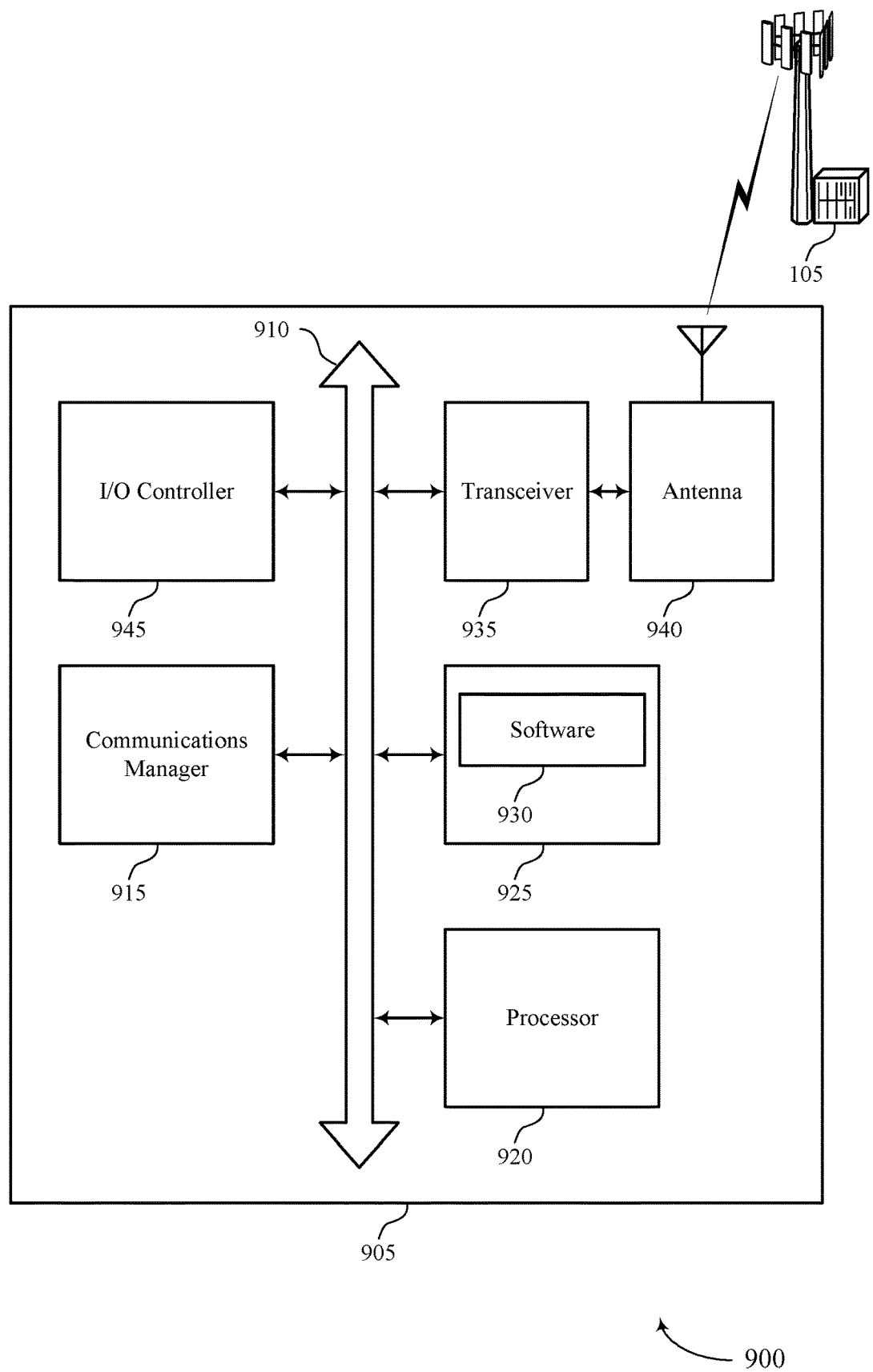
FIG. 9 illustrates a block diagram of a system including a user equipment (UE) that supports signaling design for joint uplink data and CSI feedback in accordance with aspects of the present disclosure.

FIG. 9 shows a diagram of a system 900 including a device 905 that supports signaling design for joint uplink data and CSI feedback in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting signaling design for joint uplink data and CSI feedback).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support signaling design for joint uplink data and CSI feedback. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
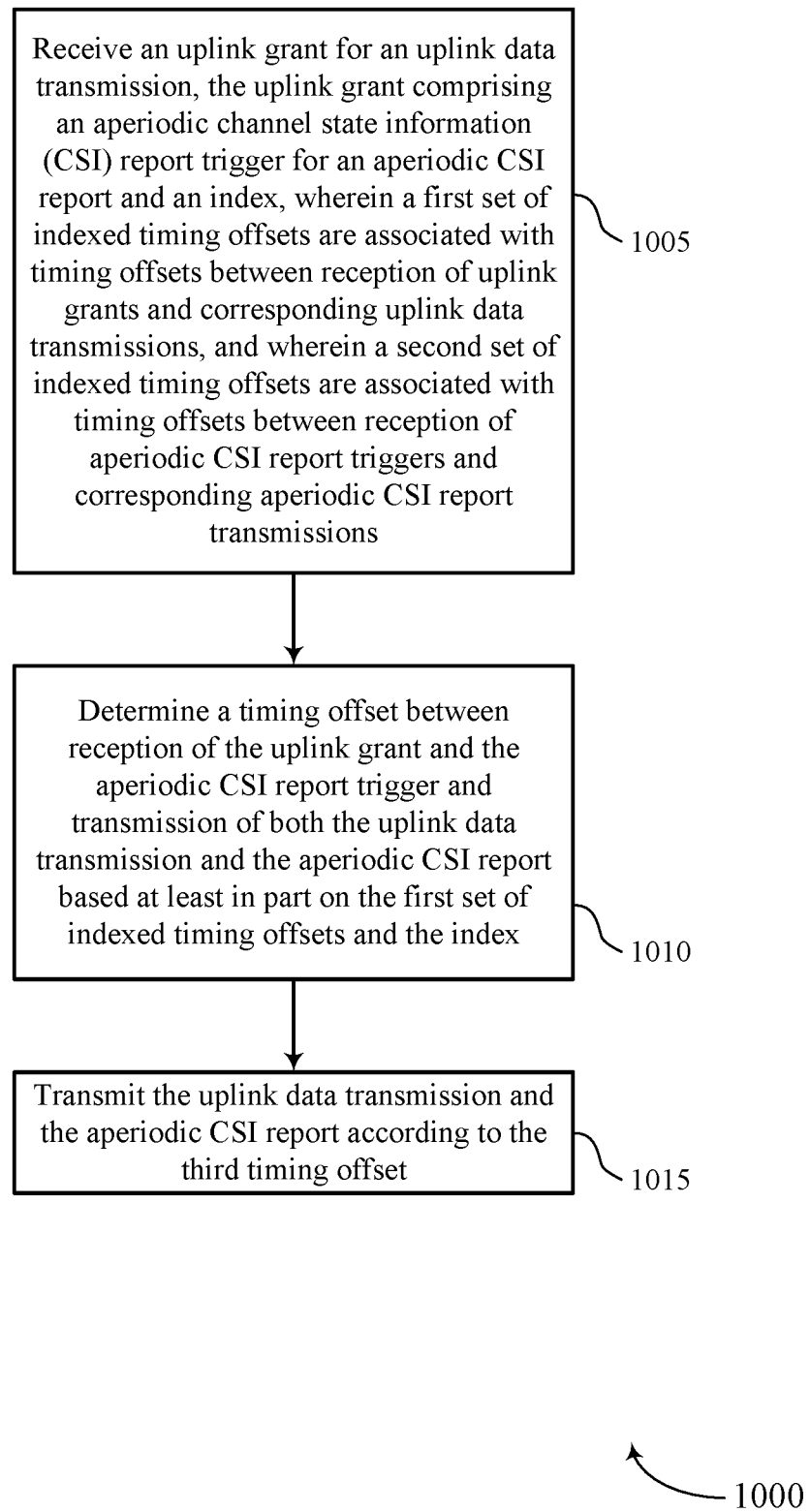
FIGS. 10 through 12 illustrate methods for signaling design for joint uplink data and CSI feedback in accordance with aspects of the present disclosure.

FIG. 10 shows a flowchart illustrating a method 1000 for signaling design for joint uplink data and CSI feedback in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may receive an uplink grant for an uplink data transmission, the uplink grant comprising an aperiodic channel state information (CSI) report trigger for an aperiodic CSI report and an index, wherein a first set of indexed timing offsets are associated with timing offsets between reception of uplink grants and corresponding uplink data transmissions, and wherein a second set of indexed timing offsets are associated with timing offsets between reception of aperiodic CSI report triggers and corresponding aperiodic CSI report transmissions. The operations of block 1005 may be performed according to the methods described herein. In certain examples, aspects of the operations of block 1005 may be performed by a timing offset component as described with reference to FIGS. 6 through 9.

At block 1010 the UE 115 may a timing offset between reception of the uplink grant and the aperiodic CSI report trigger and transmission of both the uplink data transmission and the aperiodic CSI report based at least in part on the first set of indexed timing offsets and the index. The operations of block 1010 may be performed according to the methods described herein. In certain examples, aspects of the operations of block 1010 may be performed by a timing offset component as described with reference to FIGS. 6 through 9.

At block 1015 the UE 115 may transmit the uplink data transmission and the aperiodic CSI report according to the third timing offset. The operations of block 1015 may be performed according to the methods described herein. In certain examples, aspects of the operations of block 1015 may be performed by a joint transmission component as described with reference to FIGS. 6 through 9.

Figure 11:
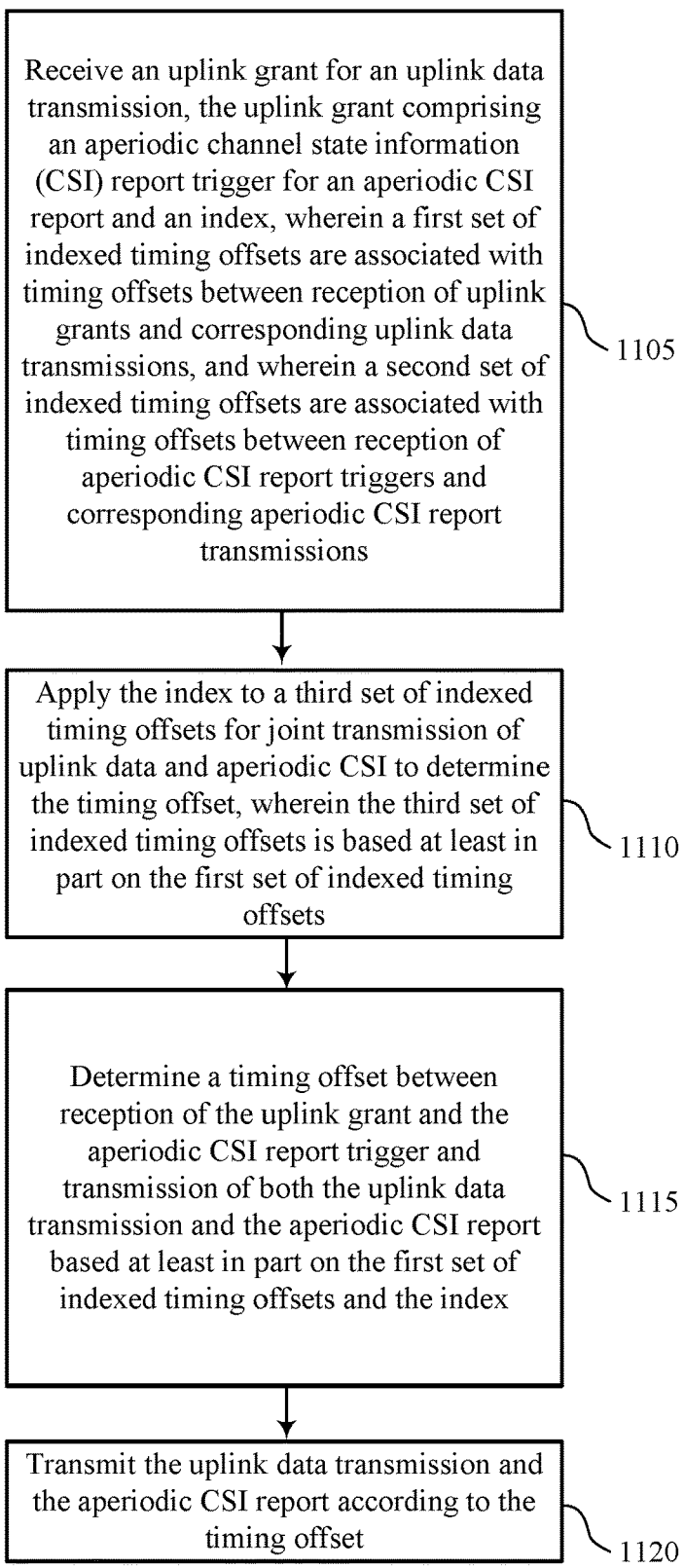

FIG. 11 shows a flowchart illustrating a method 1100 for signaling design for joint uplink data and CSI feedback in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may receive an uplink grant for an uplink data transmission, the uplink grant comprising an aperiodic channel state information (CSI) report trigger for an aperiodic CSI report and an index, wherein a first set of indexed timing offsets are associated with timing offsets between reception of uplink grants and corresponding uplink data transmissions, and wherein a second set of indexed timing offsets are associated with timing offsets between reception of aperiodic CSI report triggers and corresponding aperiodic CSI report transmissions. The operations of block 1105 may be performed according to the methods described herein. In certain examples, aspects of the operations of block 1105 may be performed by a timing offset component as described with reference to FIGS. 6 through 9.

At block 1110 the UE 115 may apply the index to a third set of indexed timing offsets for joint transmission of uplink data and aperiodic CSI to determine the timing offset, wherein the third set of indexed timing offsets is based at least in part on the first set of indexed timing offsets. The operations of block 1110 may be performed according to the methods described herein. In certain examples, aspects of the operations of block 1110 may be performed by an index component as described with reference to FIGS. 6 through 9.

At block 1115 the UE 115 may determine a timing offset between reception of the uplink grant and the aperiodic CSI report trigger and transmission of both the uplink data transmission and the aperiodic CSI report based at least in part on the first set of indexed timing offsets and the index. The operations of block 1115 may be performed according to the methods described herein. In certain examples, aspects of the operations of block 1115 may be performed by a timing offset component as described with reference to FIGS. 6 through 9.

At block 1120 the UE 115 may transmit the uplink data transmission and the aperiodic CSI report according to the timing offset. The operations of block 1120 may be performed according to the methods described herein. In certain examples, aspects of the operations of block 1120 may be performed by a joint transmission component as described with reference to FIGS. 6 through 9.

Figure 12:
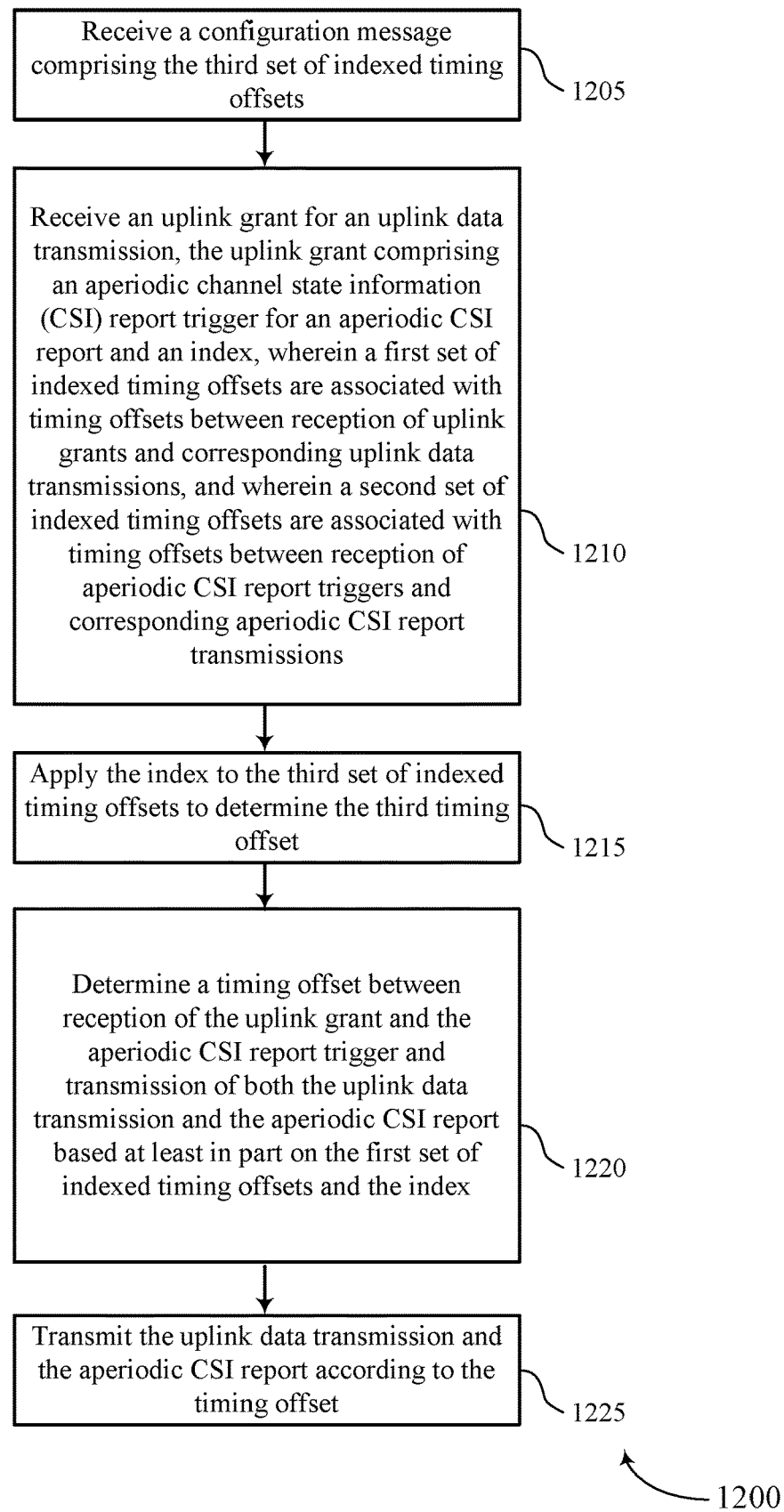

FIG. 12 shows a flowchart illustrating a method 1200 for signaling design for joint uplink data and CSI feedback in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may receive a configuration message comprising the third set of indexed timing offsets. The operations of block 1205 may be performed according to the methods described herein. In certain examples, aspects of the operations of block 1205 may be performed by a configuration message component as described with reference to FIGS. 6 through 9.

At block 1210 the UE 115 may receive an uplink grant for an uplink data transmission, the uplink grant comprising an aperiodic channel state information (CSI) report trigger for an aperiodic CSI report and an index, wherein a first set of indexed timing offsets are associated with timing offsets between reception of uplink grants and corresponding uplink data transmissions, and wherein a second set of indexed timing offsets are associated with timing offsets between reception of aperiodic CSI report triggers and corresponding aperiodic CSI report transmissions. The operations of block 1210 may be performed according to the methods described herein. In certain examples, aspects of the operations of block 1210 may be performed by a timing offset component as described with reference to FIGS. 6 through 9.

At block 1215 the UE 115 may apply the index to the third set of indexed timing offsets to determine the third timing offset. The operations of block 1215 may be performed according to the methods described herein. In certain examples, aspects of the operations of block 1215 may be performed by an index component as described with reference to FIGS. 6 through 9.

At block 1220 the UE 115 may determine a timing offset between reception of the uplink grant and the aperiodic CSI report trigger and transmission of both the uplink data transmission and the aperiodic CSI report based at least in part on the first set of indexed timing offsets and the index. The operations of block 1220 may be performed according to the methods described herein. In certain examples, aspects of the operations of block 1220 may be performed by a timing offset component as described with reference to FIGS. 6 through 9.

At block 1225 the UE 115 may transmit the uplink data transmission and the aperiodic CSI report according to the timing offset. The operations of block 1225 may be performed according to the methods described herein. In certain examples, aspects of the operations of block 1225 may be performed by a joint transmission component as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a geographic coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the geographic coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a processor;
memory coupled with the processor; and
instructions stored in the memory and executable by the processor to cause the apparatus to:
receive an uplink grant for an uplink user plane data packet transmission, the uplink grant comprising an aperiodic channel state information (CSI) report trigger for an aperiodic CSI report and an index, wherein a first set of indexed timing offsets are associated with timing offsets between reception of uplink grants and corresponding uplink user plane data packet transmissions;
determine a timing offset between reception of the uplink grant for the uplink user plane data packet transmission and transmission of both the uplink user plane data packet transmission and the aperiodic CSI report based at least in part on an application of the index to the first set of indexed timing offsets; and
transmit the uplink user plane data packet transmission and the aperiodic CSI report according to the timing offset.

2. The apparatus of claim 1, wherein:
a second set of indexed timing offsets are associated with timing offsets between reception of aperiodic CSI report triggers and corresponding aperiodic CSI report transmissions.

3. The apparatus of claim 2, wherein the instructions are further executable by the processor to cause the apparatus to:
receive a configuration message comprising the second set of indexed timing offsets.

4. The apparatus of claim 3, wherein the instructions to receive the configuration message are executable by the processor to cause the apparatus to:
receive a radio resource control information element comprising the second set of indexed timing offsets.

5. The apparatus of claim 2, wherein the instructions are further executable by the processor to cause the apparatus to:
determine that the timing offset is less than a minimum of the second set of indexed timing offsets; and
set the timing offset to the indexed timing offset based at least in part on a type of CSI for the aperiodic CSI report and the timing offset being less than the minimum of the second set of indexed timing offsets.

6. The apparatus of claim 1, wherein the instructions are further executable by the processor to cause the apparatus to:
receive a configuration message comprising the first set of indexed timing offsets.

7. The apparatus of claim 6, wherein the instructions to receive the configuration message are executable by the processor to cause the apparatus to:
receive a radio resource control information element comprising the first set of indexed timing offsets.

8. The apparatus of claim 1, wherein the uplink grant comprising a downlink control information message.

9. A method for wireless communication, comprising:
receiving an uplink grant for an uplink user plane data packet transmission, the uplink grant comprising an aperiodic channel state information (CSI) report trigger for an aperiodic CSI report and an index, wherein a first set of indexed timing offsets are associated with timing offsets between reception of uplink grants and corresponding uplink user plane data packet transmissions;
determining a timing offset between reception of the uplink grant for the uplink user plane data packet transmission and transmission of both the uplink user plane data packet transmission and the aperiodic CSI report based at least in part on an application of the index to the first set of indexed timing offsets; and
transmit the uplink user plane data packet transmission and the aperiodic CSI report according to the timing offset.

10. The method of claim 9, wherein a second set of indexed timing offsets are associated with timing offsets between reception of aperiodic CSI report triggers and corresponding aperiodic CSI report transmissions.

11. The method of claim 10, further comprising:
receiving a configuration message comprising the second set of indexed timing offsets.

12. The method of claim 11, wherein receiving the configuration message comprises:
receiving a radio resource control information element comprising the second set of indexed timing offsets.

13. The method of claim 9, further comprising:
receiving a configuration message comprising the first set of indexed timing offsets.

14. The method of claim 13, wherein receiving the configuration message comprises:
receiving a radio resource control information element comprising the first set of indexed timing offsets.

15. The method of claim 9, further comprising:
determining that the timing offset is less than a minimum of the first set of indexed timing offsets; and
setting the timing offset to the indexed timing offset based at least in part on a type of CSI for the aperiodic CSI report and the timing offset being less than the minimum of the second set of indexed timing offsets.

16. The method of claim 9, wherein the uplink grant comprising a downlink control information message.

17. An apparatus for wireless communication, comprising:
means for receiving an uplink grant for an uplink user plane data packet transmission, the uplink grant comprising an aperiodic channel state information (CSI) report trigger for an aperiodic CSI report and an index, wherein a first set of indexed timing offsets are associated with timing offsets between reception of uplink grants and corresponding uplink user plane data packet transmissions;
means for determining a timing offset between reception of the uplink grant for the user plane data packet transmission and transmission of both the uplink user plane data packet transmission and the aperiodic CSI report based at least in part on an application of the index to the first set of indexed timing offsets; and
means for transmit the uplink user plane data packet transmission and the aperiodic CSI report according to the timing offset.

18. The apparatus of claim 17, wherein:
a second set of indexed timing offsets are associated with timing offsets between reception of aperiodic CSI report triggers and corresponding aperiodic CSI report transmissions.

19. The apparatus of claim 18, further comprising:
means for receiving a configuration message comprising the second set of indexed timing offsets.

20. The apparatus of claim 18, wherein the means for receiving the configuration message comprise:
means for receiving a radio resource control information element comprising the second set of indexed timing offsets.

21. The apparatus of claim 18, further comprising:
means for determining that the timing offset is less than a minimum of the second set of indexed timing offsets; and
means for setting the timing offset to the indexed timing offset based at least in part on a type of CSI for the aperiodic CSI report and the timing offset being less than the minimum of the second set of indexed timing offsets.

22. The apparatus of claim 17, further comprising:
means for receiving a configuration message comprising the first set of indexed timing offsets.

23. The apparatus of claim 22, wherein the means for receiving the configuration message comprise:
means for receiving a radio resource control information element comprising the first set of indexed timing offsets.

24. The apparatus of claim 17, wherein the uplink grant comprising a downlink control information message.

25. A non-transitory computer-readable medium storing code for wireless communication, the code comprising instructions executable by a processor to:
receive an uplink grant for an uplink user plane data packet transmission, the uplink grant comprising an aperiodic channel state information (CSI) report trigger for an aperiodic CSI report and an index, wherein a first set of indexed timing offsets are associated with timing offsets between reception of uplink grants and corresponding uplink user plane data packet transmissions;
determine a timing offset between reception of the uplink grant for the uplink user plane data packet transmission and transmission of both the uplink user plane data packet transmission and the aperiodic CSI report based at least in part on an application of the index to the first set of indexed timing offsets; and
transmit the uplink user plane data packet transmission and the aperiodic CSI report according to the timing offset.

26. The non-transitory computer-readable medium of claim 25, wherein:
a second set of indexed timing offsets are associated with timing offsets between reception of aperiodic CSI report triggers and corresponding aperiodic CSI report transmissions.

27. The non-transitory computer-readable medium of claim 26, wherein the instructions are further executable by the processor to:
receive a configuration message comprising the second set of indexed timing offsets.

28. The non-transitory computer-readable medium of claim 26, wherein the instructions are further executable by the processor to:
determine that the timing offset is less than a minimum of the second set of indexed timing offsets; and
set the timing offset to the indexed timing offset based at least in part on a type of CSI for the aperiodic CSI report and the timing offset being less than the minimum of the second set of indexed timing offsets.

29. The non-transitory computer-readable medium of claim 25, wherein the instructions are further executable by the processor to:
receive a configuration message comprising the first set of indexed timing offsets.

30. The non-transitory computer-readable medium of claim 25, wherein the uplink grant comprising a downlink control information message.

* * * * *